(12) United States Patent
Luo

(10) Patent No.: US 12,273,461 B2
(45) Date of Patent: Apr. 8, 2025

(54) SERVICE REGISTRATION METHOD AND DEVICE

(71) Applicant: HUAWEI TECHNOLOGIES CO., LTD., Guangdong (CN)

(72) Inventor: Zhenhui Luo, Dongguan (CN)

(73) Assignee: Petal Cloud Technology Co., Ltd., Dongguan (CN)

( * ) Notice: Subject to any disclaimer, the term of this patent is extended or adjusted under 35 U.S.C. 154(b) by 245 days.

(21) Appl. No.: 18/041,367

(22) PCT Filed: Aug. 3, 2021

(86) PCT No.: PCT/CN2021/110184
§ 371 (c)(1),
(2) Date: Feb. 10, 2023

(87) PCT Pub. No.: WO2022/033350
PCT Pub. Date: Feb. 17, 2022

(65) Prior Publication Data
US 2023/0299973 A1 Sep. 21, 2023

(30) Foreign Application Priority Data

Aug. 13, 2020 (CN) .......................... 202010812614.5

(51) Int. Cl.
*H04L 67/55* (2022.01)
*H04L 9/32* (2006.01)
*H04L 61/4511* (2022.01)

(52) U.S. Cl.
CPC ............ *H04L 9/3247* (2013.01); *H04L 9/321* (2013.01); *H04L 61/4511* (2022.05); *H04L 67/55* (2022.05)

(58) Field of Classification Search
CPC ......... H04L 9/3247; H04L 9/321; H04L 9/40; H04L 61/4511; H04L 67/55; H04L 67/02; H04L 63/126; H04L 63/08
See application file for complete search history.

(56) References Cited

U.S. PATENT DOCUMENTS 10,104,049 B2 * 10/2018 Hamilton ................ G06F 9/542
10,447,482 B2 * 10/2019 Spacek .................. H04L 9/3263
(Continued)

FOREIGN PATENT DOCUMENTS

CN 106790296 A * 5/2017
CN 107395779 A * 11/2017 .......... H04L 61/1511
(Continued)

OTHER PUBLICATIONS

Scurtescu et al., "OpenID RISC Profile of IETF Security Events 1.0," IEFT Security Events, Total 22 pages (Apr. 24, 2018).
(Continued)

*Primary Examiner* — Michael R Vaughan
*Assistant Examiner* — Abdullah Almamun
(74) *Attorney, Agent, or Firm* — Leydig, Voit & Mayer, Ltd.

(57) ABSTRACT

This application provides a method, including: receiving, sent by a third-party server, a registration request which includes first information, second information, and third information, the first information is used to indicate a public key address of the third-party server, the public key address includes a first domain name, the second information is used to indicate a delivery address of event information, the delivery address includes a second domain name, the third information is used to indicate a target DNS record which includes a digital signature of the third-party server; when the first domain name is the same as the second domain name, obtaining a public key of the third-party server, and
(Continued)

obtaining the target DNS record; performing signature authentication on the digital signature based on the public key, to obtain a signature authentication result; determining, based on the signature authentication result, whether to allow the third-party server to perform registration.

20 Claims, 9 Drawing Sheets

(56) References Cited

U.S. PATENT DOCUMENTS

| | | | | |
|---|---|---|---|---|
| 2013/0073719 | A1* | 3/2013 | Ando | G06F 9/542 |
| | | | | 709/224 |
| 2020/0021446 | A1* | 1/2020 | Roennow | H04L 9/0819 |
| 2021/0064671 | A1* | 3/2021 | Ramraj | H04L 67/60 |

FOREIGN PATENT DOCUMENTS

| | | | | |
|---|---|---|---|---|
| CN | 107786571 A | * | 3/2018 | |
| WO | WO-2007106826 A2 | * | 9/2007 | H04L 61/30 |

OTHER PUBLICATIONS

Changetjuit, "This command is used to query the Dns Txt record of a domain name in Windows," Practical Technology, CSDN, total 12 pages (Dec. 22, 2016).

* cited by examiner

500

---

Receive a registration request sent by a third-party server, where the registration request includes first information, second information, and third information, where the first information is used to indicate a public key address of the third-party server, and the public key address includes a first domain name; the second information is used to indicate a delivery address of event information, and the delivery address includes a second domain name; and the third information is used to indicate a target DNS record on a domain name system DNS server, and the target DNS record includes a digital signature created by the third-party server by using a private key of the third-party server   —  S510

When the first domain name is the same as the second domain name, attempt to obtain a public key of the third-party server based on the first information, and attempt to obtain the target DNS record based on the third information   —  S520

When the public key of the third-party server and the target DNS record are obtained, perform signature authentication on the digital signature in the target DNS record based on the public key of the third-party server, to obtain a signature authentication result   —  S530

Determine, based on the signature authentication result, whether to allow the third-party server to perform registration   —  S540

| Receive a registration request sent by a third-party server, where the registration request includes first information, second information, and third information, where the first information is used to indicate a public key address of the third-party server, and the public key address includes a first domain name; the second information is used to indicate a delivery address of event information, and the delivery address includes a second domain name; and the third information is used to indicate a target DNS record on a domain name system DNS server, and the target DNS record includes a digital signature created by the third-party server by using a private key of the third-party server and an application identifier corresponding to the third-party server | S610 |

| When the first domain name is the same as the second domain name, attempt to obtain a public key of the third-party server based on the first information, and attempt to obtain the target DNS record based on the third information | S620 |

| When the public key of the third-party server and the target DNS record are obtained, perform signature authentication on the digital signature in the target DNS record based on the public key of the third-party server, to obtain a signature authentication result | S630 |

| When the signature authentication result succeeds, obtain, based on the application identifier corresponding to the third-party server, a redirection address of an application corresponding to the third-party server, where the redirection address includes a fourth domain name | S640 |

| If the second domain name is the same as the fourth domain name, determine to allow the third-party server to perform registration | S650 |

FIG. 6

SERVICE REGISTRATION METHOD AND DEVICE

CROSS-REFERENCE TO RELATED APPLICATIONS

This application is a national stage of International Application No. PCT/CN2021/110184, filed on Aug. 3, 2021, which claims priority to Chinese Patent Application No. 202010812614.5, filed Aug. 13, 2020. Both of the aforementioned applications are hereby incorporated by reference in their entireties.

TECHNICAL FIELD

This application relates to the field of communications technologies, and more specifically, to a service registration method and a device.

BACKGROUND

With continuous development of communications technologies and security authentication technologies, currently, most websites and applications all support a plurality of login manners, that is, an existing account of another website or application, such as a social account, a payment account, or an open identity (open identity document, openID) account, may be used for login without registering an account on a server of the network or application. In other words, a user can use an existing account of a non-third-party application or a non-third-party website to log in to a third-party application or a third-party website.

In some scenarios, to ensure account security or facilitate account message pushing, a third party may register an event delivery service with a party to which an account belongs. When an event or a message that is concerned by the third party is received, the party to which the account belongs delivers event information to the third party.

Currently, after the third party submits a registration request to the party to which the account belongs, the party to which the account belongs performs interface authentication, for example, OAuth authentication. Then, a registration process is completed. However, information in the registration request is not authenticated. Consequently, there is a specific security risk.

SUMMARY

This application provides a service registration method and a device, to improve security of an event delivery process.

According to a first aspect, a service registration method is provided, including: receiving a registration request sent by a third-party server, where the registration request is used to request to register an event delivery service, and the registration request includes first information, second information, and third information, where the first information is used to indicate a public key address of the third-party server, and the public key address includes a first domain name; the second information is used to indicate a delivery address of event information, and the delivery address includes a second domain name; and the third information is used to indicate a target DNS record on a domain name system DNS server, and the target DNS record includes a digital signature created by the third-party server by using a private key of the third-party server; when the first domain name is the same as the second domain name, attempting to obtain a public key of the third-party server based on the first information; and attempting to obtain the target DNS record based on the third information; and when the public key of the third-party server and the target DNS record are obtained, performing signature authentication on the digital signature in the target DNS record based on the public key of the third-party server, to obtain a signature authentication result; and determining, based on the signature authentication result, whether to allow the third-party server to perform registration.

In this embodiment of this application, a device providing the event delivery service performs authentication on ownership of a domain name of the third-party server based on the information in the registration request, to reduce a risk that event delivery information is stolen by a malicious device because the event delivery information is delivered to an authenticated delivery address, and improve security of an event delivery process.

Specifically, according to the service registration method provided in this embodiment of this application, in a process in which the third-party server registers the event delivery service, legal ownership of a domain name specified by the third-party server for the delivery address is authenticated. By authenticating whether the third-party server has a DNS record addition permission and authenticating the signature of the third-party server, security in the event delivery process can be effectively improved. When a first server determines that the third-party server does not have domain name ownership of the domain name in the delivery address, the first server may reject the third-party server to register a service. In this way, spoofing can be avoided, a risk of stealing a delivery event is reduced, security and reliability of the event delivery process are ensured, and security of sharing the event information by the first server with the third party is improved.

With reference to the first aspect, in a possible implementation, the third information includes a keyword; and the attempting to obtain the target DNS record based on the third information includes: querying the DNS server for the target DNS record based on the keyword.

This keyword is used to query the target DNS record.

With reference to the first aspect, in a possible implementation, the target DNS record includes a JSON object-based web token JWT, and the JWT includes the digital signature.

The JWT is a self-contained access token that can transfer secure and reliable information between an identity provider and a service provider.

With reference to the first aspect, in a possible implementation, the JWT includes at least one piece of the following information: a third domain name, where the third domain name is used to indicate an issuer of the JWT; an identifier of a third-party developer corresponding to the third-party server; and an application identifier corresponding to the third-party server, where the application identifier is used to identify an application corresponding to the third-party server.

The identifier of the third-party developer corresponding to the third-party server or the application identifier corresponding to the third-party server may be used to identify the application corresponding to the third-party server.

With reference to the first aspect, in a possible implementation, the performing signature authentication on the digital signature in the target DNS record based on the public key of the third-party server includes: extracting an authentication string from the target DNS record; and when the authentication string is extracted, performing signature authentication on the authentication string based on the public key of the third-party server.

With reference to the first aspect, in a possible implementation, the first information is carried in a first field, the third information is carried in a third field, and the first field and the third field belong to a same node.

With reference to the first aspect, in a possible implementation, the method further includes: when the first domain name is different from the second domain name, determining not to allow the third-party server to perform registration; or when the public key of the third-party server and/or the target DNS record are/is not obtained, determining not to allow the third-party server to perform registration.

When the first domain name is different from the second domain name, the registration of the third-party server is rejected, so that some spoofing risks can be avoided, and security of the event delivery process can be improved.

When the public key of the third-party server and/or the target DNS record are/is not obtained, the registration of the third-party server is rejected, so that some spoofing risks can be avoided, and security of the event delivery process is improved.

With reference to the first aspect, in a possible implementation, the method further includes: when the authentication string is not extracted, determining not to allow the third-party server to perform registration.

With reference to the first aspect, in a possible implementation, the event delivery service includes an open identity openID account risk event delivery.

According to a second aspect, a service registration method is provided, including: receiving a registration request sent by a third-party server, where the registration request is used to request to register an event delivery service, and the registration request includes first information, second information, and third information, where the first information is used to indicate a public key address of the third-party server, and the public key address includes a first domain name; the second information is used to indicate a delivery address of event information, and the delivery address includes a second domain name; and the third information is used to indicate a target DNS record on a domain name system DNS server, and the target DNS record includes a digital signature created by the third-party server by using a private key of the third-party server and an application identifier corresponding to the third-party server, where the application identifier is used to identify an application corresponding to the third-party server; when the first domain name is the same as the second domain name, attempting to obtain a public key of the third-party server based on the first information; and attempting to obtain the target DNS record based on the third information; when the public key of the third-party server and the target DNS record are obtained, performing signature authentication on the digital signature in the target DNS record based on the public key of the third-party server, to obtain a signature authentication result; when the signature authentication result succeeds, obtaining, based on the application identifier corresponding to the third-party server, a redirection address of the application corresponding to the third-party server, where the redirection address includes a fourth domain name; and when the second domain name is the same as the fourth domain name, determining to allow the third-party server to perform registration.

In this embodiment of this application, a device providing the event delivery service performs authentication on ownership of a domain name of the third-party server based on the information in the registration request, to reduce a risk that event delivery information is stolen by a malicious device because the event delivery information is delivered to an authenticated delivery address, and improve security of an event delivery process.

Specifically, according to the service registration method provided in this embodiment of this application, in a process in which the third-party server registers the event delivery service, legal ownership of a domain name specified by the third-party server for the delivery address is authenticated. By authenticating whether the third-party server has a DNS record addition permission and authenticating the signature of the third-party server, security in the event delivery process can be effectively improved. When a first server determines that the third-party server does not have domain name ownership of the domain name in the delivery address, the first server may reject the third-party server to register a service. In this way, spoofing can be avoided, a risk of stealing a delivery event is reduced, security and reliability of the event delivery process are ensured, and security of sharing the event information by the first server with the third party is improved. In addition, delivering the event information to a third party that does not register an account with the first server can be avoided.

With reference to the second aspect, in a possible implementation, the third information includes a keyword; and the attempting to obtain the target DNS record based on the third information includes: querying the DNS server for the target DNS record based on the keyword.

With reference to the second aspect, in a possible implementation, the target DNS record includes a JSON object-based web token JWT, and the JWT includes the digital signature.

With reference to the second aspect, in a possible implementation, the JWT includes at least one piece of the following information: a third domain name, where the third domain name is used to indicate an issuer of the JWT; an identifier of a third-party developer corresponding to the third-party server; and the application identifier corresponding to the third-party server.

With reference to the second aspect, in a possible implementation, the performing signature authentication on the digital signature in the target DNS record based on the public key of the third-party server includes: extracting an authentication string from the target DNS record; and when the authentication string is extracted, performing signature authentication on the authentication string based on the public key of the third-party server.

With reference to the second aspect, in a possible implementation, the first information is carried in a first field, the third information is carried in a third field, and the first field and the third field belong to a same node.

With reference to the second aspect, in a possible implementation, the method further includes: when the first domain name is different from the second domain name, determining not to allow the third-party server to perform registration; or when the public key of the third-party server and/or the target DNS record are/is not obtained, determining not to allow the third-party server to perform registration; or when the signature authentication result fails, determining not to allow the third-party server to perform registration; or when the second domain name is different from the fourth domain name, determining not to allow the third-party server to perform registration.

With reference to the second aspect, in a possible implementation, the method further includes: when the authentication string is not extracted, determining not to allow the third-party server to perform registration.

With reference to the second aspect, in a possible implementation, the event delivery service includes an openID account risk event delivery.

According to a third aspect, a service registration method is provided, including: A third-party server sends a registration request to a first server. The registration request is used to request to register an event delivery service, and the registration request includes first information, second information, and third information. The first information is used to indicate a public key address of the third-party server, and the public key address includes a first domain name. The second information is used to indicate a delivery address of event information, and the delivery address includes a second domain name. The third information is used to indicate a target DNS record on a domain name system DNS server, and the target DNS record includes a digital signature created by the third-party server by using a private key of the third-party server. A public key corresponding to the public key address of the third-party server is used by the first server to perform signature authentication on the digital signature when the first domain name is the same as the second domain name, to determine whether the third-party server is allowed to perform registration.

When registering the event delivery service, the third-party server provides the first information, the second information, and the third information for the first server, so that the first server can authenticate legal ownership of a domain name specified by the third-party server for the delivery address, so that security in the event delivery process is effectively improved.

With reference to the third aspect, in a possible implementation, before that a third-party server sends a registration request to a first server, the method further includes: The third-party server writes the target DNS record into the DNS server.

With reference to the third aspect, in a possible implementation, the first information is carried in a first field, the third information is carried in a third field, and the first field and the third field belong to a same node.

With reference to the third aspect, in a possible implementation, the event delivery service includes an openID account risk event delivery.

According to a fourth aspect, a service registration method is provided, including: A third-party server sends a registration request to a first server. The registration request is used to request to register an event delivery service, and the registration request includes first information, second information, and third information. The first information is used to indicate a public key address of the third-party server, and the public key address includes a first domain name. The second information is used to indicate a delivery address of event information, and the delivery address includes a second domain name. The third information is used to indicate a target DNS record on a domain name system DNS server, and the target DNS record includes a digital signature created by the third-party server by using a private key of the third-party server and an application identifier corresponding to the third-party server. A public key corresponding to the public key address of the third-party server is used by the first server to perform signature authentication on the digital signature when the first domain name is the same as the second domain name. The application identifier corresponding to the third-party server is used to indicate a redirection address of the application corresponding to the third-party server. The redirection address is used to identify the application corresponding to the third-party server, the redirection address includes a fourth domain name, and whether the fourth domain name is the same as the second domain name is used to determine whether the third-party server is allowed to perform registration.

When registering the event delivery service, the third-party server provides the first information, the second information, and the third information for the first server, so that the first server can authenticate legal ownership of a domain name specified by the third-party server for the delivery address, so that security in the event delivery process is effectively improved.

With reference to the fourth aspect, in a possible implementation, before that a third-party server sends a registration request to a first server, the method further includes: The third-party server writes the target DNS record into the DNS server.

With reference to the fourth aspect, in a possible implementation, the first information is carried in a first field, the third information is carried in a third field, and the first field and the third field belong to a same node.

With reference to the fourth aspect, in a possible implementation, the event delivery service includes an openID account risk event delivery.

According to a fifth aspect, a device is provided, including a module or unit configured to perform the method in any one of the first aspect or the possible implementations of the first aspect, or a module or unit configured to perform the method in any one of the second aspect or the possible implementations of the second aspect. The module or unit may be implemented by a hardware circuit, software, or a combination of a hardware circuit and software.

Optionally, the device may be the first server mentioned above.

According to a sixth aspect, a device is provided, including a module or unit configured to perform the method in any one of the third aspect or the possible implementations of the third aspect, or a module or unit configured to perform the method in any one of the fourth aspect or the possible implementations of the fourth aspect. The module or unit may be implemented by a hardware circuit, software, or a combination of a hardware circuit and software.

Optionally, the device may be the third server mentioned above.

According to a seventh aspect, an apparatus is provided, including a processor and a memory. The memory stores instructions, and the processor is configured to invoke the instructions from the memory and execute the instructions, so that the apparatus is enabled to perform the method in any one of the first aspect or the possible implementations of the first aspect, or perform the method in any one of the second aspect or the possible implementations of the second aspect.

Optionally, the apparatus further includes a transceiver.

According to an eighth aspect, an apparatus is provided, including a processor and a memory. The memory stores instructions, and the processor is configured to invoke the instructions from the memory and execute the instructions, so that the apparatus is enabled to perform the method in any one of the third aspect or the possible implementations of the third aspect, or perform the method in any one of the fourth aspect or the possible implementations of the fourth aspect.

Optionally, the apparatus further includes a transceiver.

According to a ninth aspect, an apparatus is provided. The apparatus includes at least one processor and a communications interface. The communications interface is used by the apparatus to exchange information with another apparatus, and when a program instruction is executed in the at least one processor, the apparatus is enabled to perform the method in any one of the first aspect or the possible implementations of the first aspect, or perform the method in any one of the second aspect or the possible implementations of the second aspect.

Optionally, the communications interface may be a transceiver, a circuit, a bus, a module, a pin, or a communications interface of another type.

Optionally, the apparatus further includes a memory. The memory is configured to store instructions and data. When executing the instructions stored in the memory, the processor may implement the method described in any one of the first aspect or the possible implementations of the first aspect, or perform the method in any one of the second aspect or the possible implementations of the second aspect.

According to a tenth aspect, an apparatus is provided. The apparatus includes at least one processor and a communications interface. The communications interface is used by the apparatus to exchange information with another apparatus, and when a program instruction is executed in the at least one processor, the apparatus is enabled to perform the method in any one of the third aspect or the possible implementations of the third aspect, or perform the method in any one of the fourth aspect or the possible implementations of the fourth aspect.

Optionally, the communications interface may be a transceiver, a circuit, a bus, a module, a pin, or a communications interface of another type.

Optionally, the apparatus further includes a memory. The memory is configured to store instructions and data. When executing the instructions stored in the memory, the processor may implement the method in any one of the third aspect or the possible implementations of the third aspect, or perform the method in any one of the fourth aspect or the possible implementations of the fourth aspect.

According to an eleventh aspect, a computer-readable storage medium is provided. The computer-readable storage medium stores a computer program, and when the computer program runs on a computer, the computer is enabled to perform the method in any one of the first aspect or the possible implementations of the first aspect, or perform the method in any one of the second aspect or the possible implementations of the second aspect.

According to a twelfth aspect, a computer-readable storage medium is provided. The computer-readable storage medium stores a computer program, and when the computer program runs on a computer, the computer is enabled to perform the method in any one of the third aspect or the possible implementations of the third aspect, or perform the method in any one of the fourth aspect or the possible implementations of the fourth aspect.

According to a thirteenth aspect, a computer program product including instructions is provided. When the computer program product runs on a computer, the computer is enabled to perform the method in any one of the first aspect or the possible implementations of the first aspect, or perform the method in any one of the second aspect or the possible implementations of the second aspect.

According to a fourteenth aspect, a computer program product including instructions is provided. When the computer program product runs on a computer, the computer is enabled to perform the method in any one of the third aspect or the possible implementations of the third aspect, or perform the method in any one of the fourth aspect or the possible implementations of the fourth aspect.

According to a fifteenth aspect, a service registration system is provided, including the first server described in the first aspect and the third-party server described in the third aspect, or the system includes the first server described in the second aspect and the third-party server described in the fourth aspect.

BRIEF DESCRIPTION OF DRAWINGS

FIG. 5 is a schematic flowchart of a service registration method according to an embodiment of this application;

FIG. 6 is a schematic flowchart of a service registration method according to an embodiment of this application;

DESCRIPTION OF EMBODIMENTS

Figure 1:
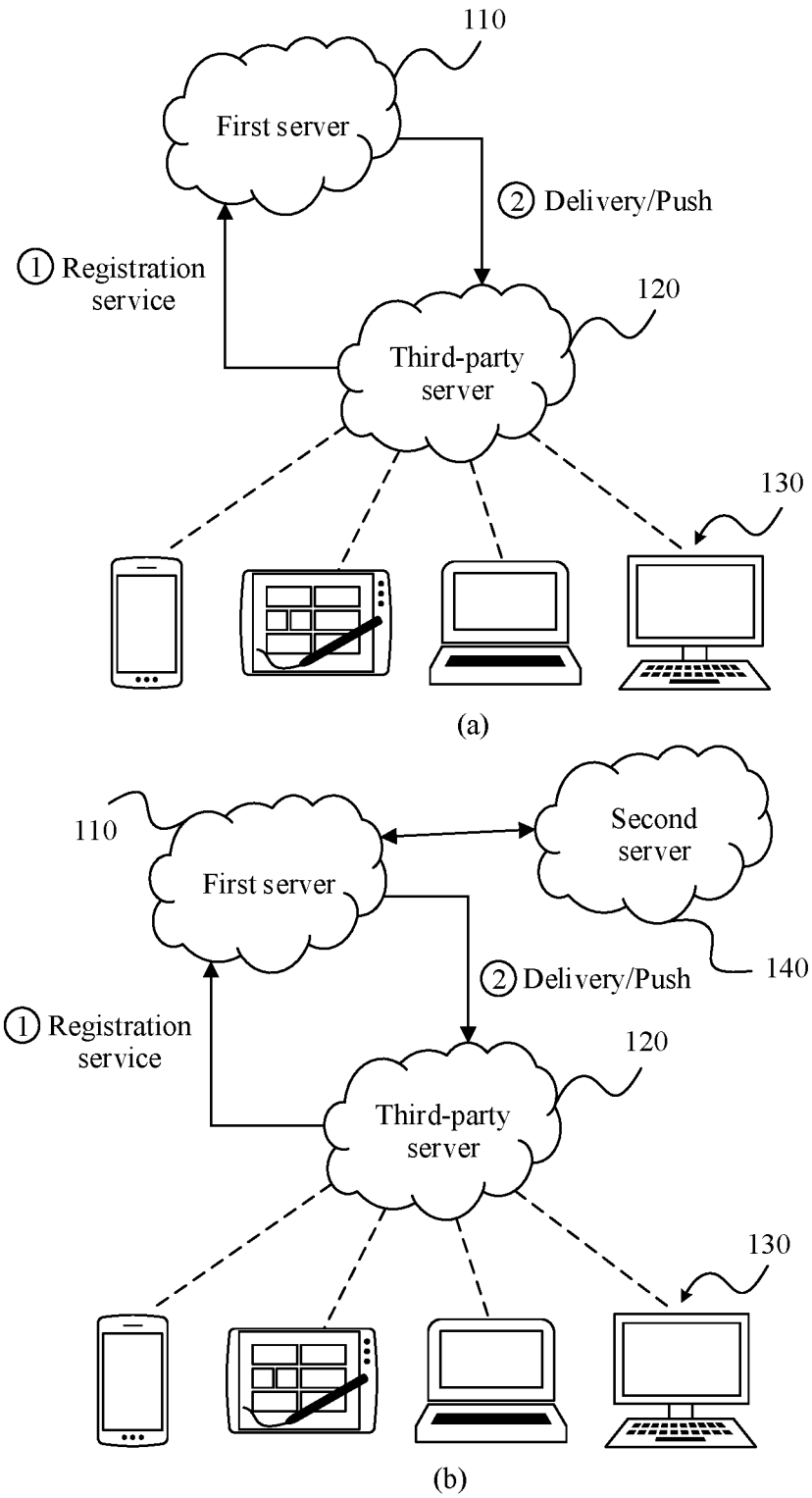
FIG. 1 is a schematic diagram of an application scenario according to an embodiment of this application.

The following provides descriptions of technical solutions of this application with reference to the accompanying drawings. For ease of understanding, the following first describes related concepts in this application.

A uniform resource identifier (URI) is a character string used to identify an abstract or physical resource, and is used to uniquely identify one resource. Generally, a URI includes three parts: a naming mechanism for accessing a resource, a host name for storing a resource, and a name of a resource.

A uniform resource locator (URL) is a character string of a main access mechanism of a locating resource, which can uniquely identify one resource, and can further provide locating resource information. A URL generally includes three parts: a protocol (or referred to as a service mode), an IP address of a host that stores a resource, and a specific address of a host resource, such as a directory and a file name. The URI belongs to a parent class. The URL belongs to a child class of the URI, and is an implementation of a URI concept.

An open identity (open identity document, OpenID) is a distributed identity authentication solution that uses a URL as an identity. One OpenID is one URL. A user can use one URL to log in to a plurality of websites for identity authentication the user. A process of obtaining an OpenID account is as follows: The user registers on an OpenID service website and obtains a URL. The URL is a user name, and a corresponding password is stored on the OpenID server website. After having a valid OpenID account, the user can use the account to log in to any website that supports OpenID authentication. When the user logs in, a login website requests the OpenID service website to authenticate a user identity. If the user identity passes the authentication, the login succeeds. An OpenID system can be used in all scenarios where identity authentication is required. The OpenID system can be used in a single sign-on system, and also can be used for identity authentication when sensitive data is shared.

Public key cryptography is also referred to as asymmetric cryptography, and is a type of cryptographic algorithm that requires two separate keys. One is a secretive private key, and the other is a public key. The public key and the private key are mathematically linked. The public key is used to encrypt a plaintext or authenticate a digital signature (that is, perform signature authentication). The private key is used to decrypt a ciphertext or create a digital signature (that is, perform signature).

A digital signature is a mathematical scheme used to demonstrate authenticity of a digital message or document. A valid digital signature may allow a receiver to determine that the message is created by a known sender (authentication), and the sender cannot deny that the message is signed (nonrepudiation). In addition, authenticating the digital signature may also confirm that the message is not changed during transmission (integrity).

For a certificate (certificate) and certificate authorization (certificate authority, CA), in cryptography, a certificate authorization CA center is an entity that issues a digital certificate. The digital certificate proves ownership of a public key by using a specified subject of the certificate. This allows another (relying party) to rely on a signature or an assertion about a private key corresponding to an authentication public key. In this trust relationship model, the CA is a trusted third party, which is trusted by a body (owner) of the certificate and a party that relies on the certificate. A plurality of public key infrastructure (PM) schemes use CA.

A signature and a signature authentication process are as follows: (1) A transmitting end performs a hash (HASH) operation on an original text to be transmitted, to obtain a digital digest. (2) The transmitting end encrypts the digital digest by using a private key of the transmitting end. The encrypted digital digest is a signature. (3) The transmitting end sends the original text and the digital signature to a receiving end. (4) The receiving end decrypts the signature by using a public key of the transmitting end, to obtain the digital digest. (5) The transmitting end calculates a digest value of the original text by using the same method as the transmitting end, and compares the digest value with the digital digest obtained through decryption. If the two are the same, it proves that the original text is not tampered with during transmission.

A JSON object-based network token (Json web token, JWT) is a self-contained access token, is generally used to transmit secure and reliable information between an identity provider and a service provider, and is generally used for cross-domain identity authentication. The JWT transfers information securely in a form of a JSON object. Because there is a digital signature, the transferred information is secure. One JWT is actually one character string, containing three parts separated by using (.): a header (header), a payload (payload), and a signature (signature) (format: header.payload.signature). The signature (signature) is used to confirm a sender of JWT information and ensure that the information is not tampered with. The signature is obtained by encrypting an encoded header, an encoded payload, and a private key by using an algorithm specified in the header.

A domain name system (DNS) is a hierarchical naming system built on a database, and is used to perform conversion between a domain name and an IP address. A resource record is also referred to as a DNS record, and is a resource that is included in each domain and that is related to the DNS, for example, a data entry having a special function. Based on application scenarios, DNS records can be classified into different types, such as an address (A) record, a mail exchanger (MX) record, a domain name server (NS) record, a canonical name (CNAME) record, a text (TXT) record, a time-to-live (TTL) record, pointer (PTR) record, and a public key (KEY) record. Only a person who has domain name ownership may add the DNS record to the domain name system, that is, a person who has a DNS maintenance permission of the domain name can prove the domain name ownership.

Domain name resolution tools include a dig command, a host command, an nslookup command, a whois command, and the like. The dig command can be used to separately view an NS record of each level of domain name. The host command can be used to return various records of a current requested domain name. The nslookup command is used to query a domain name record in interactive mode. The whois command is used to view a registration status of a domain name.

FIG. 1 is a schematic diagram of an application scenario according to an embodiment of this application. As shown in (a) in FIG. 1, the application scenario may include a first server 110, a third-party server 120, and a terminal device 130.

The first server 110 and the third-party server 120 are configured to provide a computing or application service for the terminal device 130. For example, the first server and the third-party server each may be an application server, a communications server (such as a mail server, a fax server, or a file transfer protocol (FTP) server), a website server, or a database server, or may be a work group-level server, a department-level server, or an enterprise-level server.

The terminal device 130 is a device that can register a service on a server, for example, a mobile phone, a tablet computer, a wearable device, an in-vehicle device, or an augmented reality (AR)/virtual reality (VR) device, a notebook computer, an ultra-mobile personal computer (UMPC), a netbook, a personal digital assistant (PDA), a television, or the like.

In this embodiment of this application, the first server 110 may not only provide an account identity management and authentication service for a user, but also provide an account event delivery service. The user may register an account on the first server 110, to better experience a service provided by a website (Web) or an application (APP) corresponding to the first server 110. With continuous development of communications technologies and security authentication technologies, the account registered on the first server 110 may not only be used to log in to an application corresponding to the first server 110, but also be used to log in to a third-party application or website corresponding to the third-party server 120. In addition, information related to the account registered on the first server 110 may be not only delivered by the first server 110 to the terminal device 130, but also delivered by the first server 110 to the third-party server 120, and delivered by the third-party server 120 to the terminal device 130. The following uses an example for description with reference to FIG. 1.

For example, a user M registers an account A on the first server 110, and authorizes the third-party server 120 to push related information of the account A to the user M by using a third-party application client corresponding to the third-party server 120. In this case, the third-party server 120 may register an account event delivery service with the first server 110. When the information related to the account A needs to be pushed to the user M, the first server 110 may push the information to the third-party server 120, and then the third-party server 120 interacts with a third-party application client on the terminal device 130, and sends the information to the third-party application client, so that the user M can view the information conveniently. For example, the user M registers the account A on a social application server (the first server 110) corresponding to a social application. The user M may authorize a third-party application client, for example, a mail application client. A corresponding mail server (the third-party server 120) pushes account risk information related to the account A to an application client, for example, a mail application client, corresponding to the mail server (the third-party server 120). When a risk occurs to the account A of the user M, the social application server (the first server 110) delivers an account risk event to the mailbox server (the third-party server 120), and then the mailbox server (the third-party server 120) interacts with the mailbox application client, so that the user M can learn the risk of the account A in time.

For another example, the first server 110 is configured to manage account information of an application (or a website), and the third-party server 120 may register a delivery service on the first server 110, so that the first server 110 sends information (for example, a statistical rule of the information related to the account and a big data analysis result) related to the account to the third-party server 120, which is convenient for a user of the third-party server 120 to view and use received information.

For still another example, the user M registers the account A on the first server 110, and the user M may use the account A to log in to a third-party application (or a website) corresponding to the third-party server 120. For example, the user M may register the account A on a social application server (the first server 110) corresponding to a social application, and then use the account A of the social application to log in to a payment application (a third-party application) corresponding to a payment application server (the third-party server 120). In this case, the third-party server 120 registers an account event delivery service on the first server 110. When an account risk occurs to the account A of the user M, the first server 110 may deliver a risk event to the third-party server 120, and then the third-party server 120 interacts with a third-party application (or website) on the terminal device 130, to make a response in a timely manner, for example, logging out or account deregistering.

However, regardless of whether the third-party server 120 is configured to push information or assist in ensuring account security, the third-party server 120 needs to first complete a registration process of the account event delivery service, for example, a "☐ Registration service" process shown in (a) in FIG. 1, to receive the account risk event, the information related to the account, and the like, for example, a "☐ Delivery/Push" process shown in (a) in FIG. 1.

The first server 110 in (a) in FIG. 1 is configured to provide the account identity management and authentication service, and further configured to provide the account event delivery service. The third-party server 120 may directly register the account event delivery service with the first server 110, and may deliver the account event to the third-party server 120 when the first server 110 identifies the account event. In some other embodiments, the account identity management and authentication service and the account event delivery service may alternatively be separately deployed on different servers. As shown in (b) in FIG. 1, a second server 140 is configured to provide an account identity management and authentication service, and a first server 110 is configured to provide an account event delivery service. The user registers an account on the second server 140. A registration process is similar to the case described in (a) in FIG. 1. Details are not described again. The third-party server 120 may directly interact with the first server 110, to register an account event delivery service. The first server 110 needs to obtain an account event from the second server 140, to deliver the account event to the third-party server 120.

Currently, a plurality of third-party websites support login by using an openID account. The user may register an openID account on an openID server and use the registered openID account to log in to a third-party application or website corresponding to a third-party server. By using (a) in FIG. 1 as an example, the first server 110 may be used as an openID server. The first server 110 is configured to provide an openID account identity management and authentication service, and is further configured to provide an openID account event delivery service. In this case, the third-party server 120 may register an openID account event delivery service on the first server 110. When a risk event occurs to the openID account of the user, the first server 110 may deliver the account risk event to the third-party server 120, so that the third-party server 120 makes a response in a timely manner. By using (b) in FIG. 1 as an example, the second server 140 may alternatively be used as an openID server. In this case, the second server 140 is configured to provide an openID account identity management and authentication service, and the first server 110 is used for an openID account event delivery service. In this case, the third-party server 120 interacts with the first server 110 to register the openID account event delivery service. The first server 110 needs to obtain an openID account event from the second server 140, to deliver the openID account event to the third-party server 120.

To standardize the openID account incident delivery service, an OPENID organization defines an account risk and incident sharing and coordinator (RISC) specification, also referred to as the RISC specification. The RISC specification mainly describes a thing that an abnormal account risk and incident generated or identified by an account holding party side is notified to a third-party server that is authorized by the user and that is of the account, to facilitating making a quick response to the third-part server.

In this embodiment of this application, that a server is configured to provide an openID account event delivery service may also be referred to as that the server is configured to provide a RISC service. Both the first servers 110 in (a) and (b) in FIG. 1 are configured to provide an account event delivery service. For ease of understanding, an example in which the first server 110 is a server providing a RISC service is used for description in the following embodiments of this application.

Figure 2:
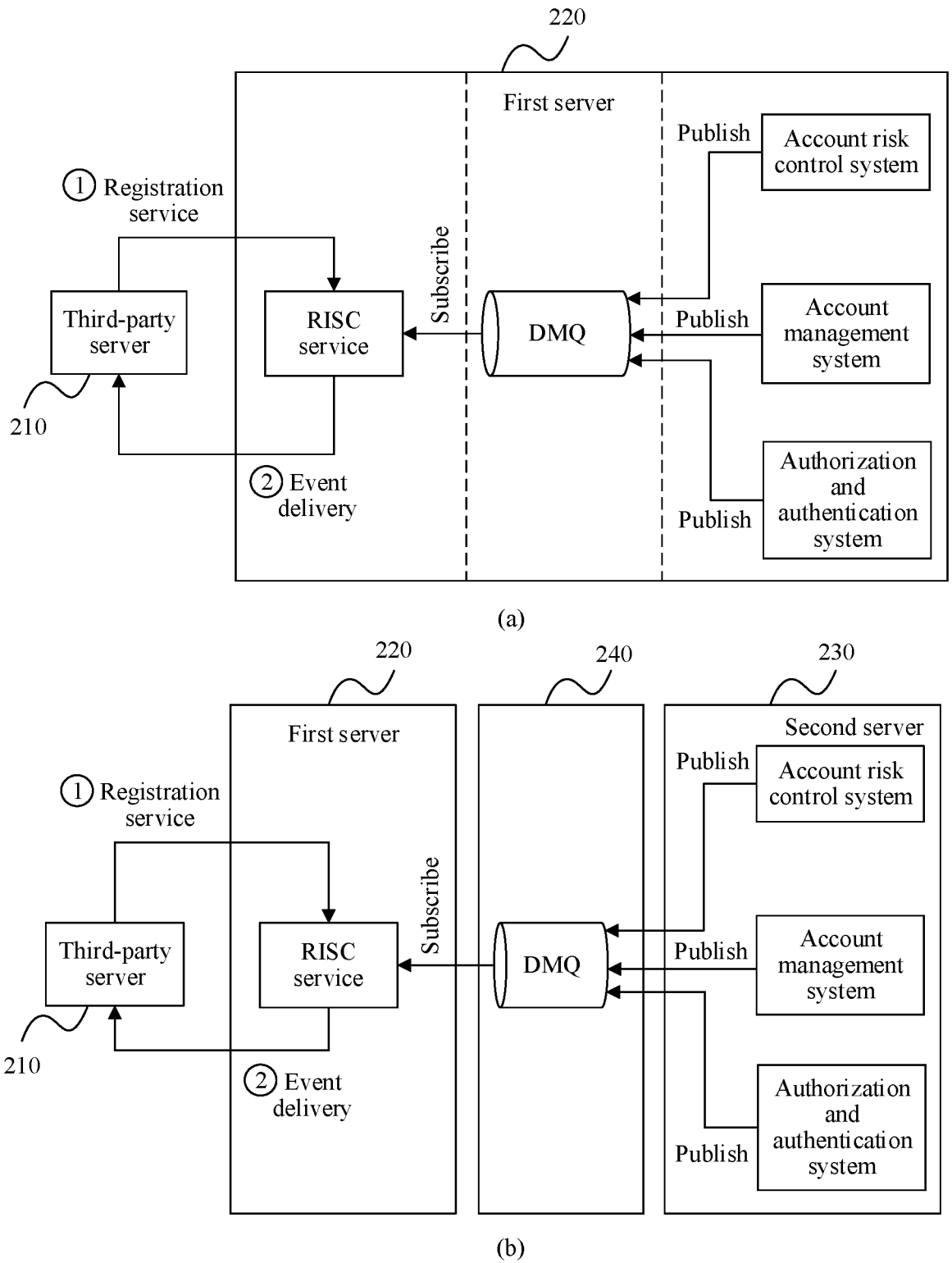
FIG. 2 is a schematic block diagram of a RISC service architecture according to an embodiment of this application.

FIG. 2 is a schematic block diagram of a RISC service architecture according to an embodiment of this application. As shown in (a) in FIG. 2, the service architecture mainly includes a third-party server 210 and a first server 220.

The third-party server 210 is a device that registers a RISC service with the first server 220. The third-party server 210 may be a third-party application server or a third-party website server. This is not limited in this embodiment of this application. Generally, a user may use an openID account to log in to an application or a website corresponding to the third-party server 210.

The first server 220 is a device that provides an account identity management and authentication service and the RISC service. Different services can be provided by a same service provider, that is, a service provider can provide both an account identity management and authentication service and a RISC service. Alternatively, the RISC service and the account identity management and authentication service may be separately provided by different service providers. This is not limited in this embodiment of this application. As shown in (a) in FIG. 2, the account identity management and authentication service and the RISC service are deployed on a same device, that is, the first server 220. The first server 220 may identify an account risk event, and deliver the account risk event to the third-party server 210.

Specifically, an account system, for example, a cloud account system, is deployed on the first server 210, and the RISC service is further deployed. Distributed message queue (DMQ) middleware is disposed between the RISC service and the account system. The account system may also be referred to as an identity authentication system, and is configured to provide an account identity management and authentication service, and may further provide an account risk event for the RISC service. For example, the account system may specifically include an account risk control system, an account management system, an authorization and authentication system, and the like. The account risk control system is mainly responsible for account risk assessment, and may provide event information such as a stolen account and a junk account for the RISC service. The account management system is mainly responsible for basic function management such as account registration, password change, login, and deregistration. The system may provide event information such as login failure, account freezing, account unfreezing, account deletion, account deregistration, and password resetting for the RISC service. The authorization and authentication system is mainly responsible for functions such as account permission granting, credential issuing, and access authentication. The system may provide event information such as credential revocation for the RISC service. The authorization and authentication system may perform authentication and authorization based on OAuth. The RISC service is used to implement a registration process of an account event delivery service and a delivery process of an account event.

Refer to (a) in FIG. 2. The third-party server 210 needs to send a registration request to the RISC service deployed on the first server 220, to complete the registration process of the account event delivery service (that is, complete a service registration process shown in the figure). When the account system deployed on the first server 220 generates or identifies that an account risk occurs, an account risk event is published to the DMQ. The RISC service obtains the account risk event from the DMQ, and then delivers the account risk event to the third-party server 210. The distributed message queue (DMQ) middleware herein may be a queue processor, configured to support and ensure reliable asynchronous communication between components. In some embodiments, the RISC service may be implemented according to a RISC protocol.

In (a) in FIG. 2, the account system and the RISC service are deployed on a same device, for example, different modules deployed on the same server. In some other embodiments, the account system and the RISC service may be deployed on different devices. As shown in (b) in FIG. 2, the RISC service architecture includes a third-party server 210, a first server 220 configured to provide a RISC service, and a second server 230 configured to provide an account identity management and authentication service.

Specifically, the third-party server 210 is a device that registers a RISC service with the first server 220. The first server 220 is a device (RISC provider) on which the RISC service is deployed. The second server 230 is a device on which an account system is deployed. The RISC service may perform cross-account management. The RISC service and the account system may form a publishing/subscription system. Distributed message queue (DMQ) middleware 240 is disposed between the RISC service and the account system. The third-party server 210 needs to first send a registration request to the RISC service deployed on the first server 220, to complete a registration process of an account event delivery service. The account system deployed on the second server 230 may provide an account risk event for the RISC service deployed on the first server 220. When the second server 230 generates or identifies that an account risk occurs, the account risk event is published to the DMQ 240. The first server 210 subscribes to and consumes the account risk event from the DMQ 240. That is, after obtaining the account risk event, the first server 210 delivers the account risk event to the third-party server 210.

The DMQ 240 shown in (b) in FIG. 2 may be deployed on the first server 220, may be deployed on the second server 230, or may be independently deployed on another device. This is not limited in this embodiment of this application. In addition, for descriptions about the RISC service and the account system in (b) in FIG. 2, refer to the related descriptions in (a) in FIG. 2. For brevity, details are not described herein again.

As described above, the RISC service and the account identity management and authentication service in FIG. 2(b) are respectively deployed on the first server 220 and the second server 230. The first server 220 and the second server 230 may belong to a same server cluster, or may belong to different server clusters.

In conclusion, refer to (a) and (b) in FIG. 2. If the third-party server 210 needs to use the RISC service, the third-party server 210 needs to register an event concern registry in advance, and requests the first server 220 to register a concerned event. In this way, when an event concerned by the third-party server 210 is generated, the first server 220 that provides the RISC service may access an external network, perform event delivery, and deliver an account event message to the third-party server 210. The process is a "① Registration service" and "② Incident delivery" process marked in FIG. 2. The following describes the process in detail with reference to FIG. 3.

Figure 3:
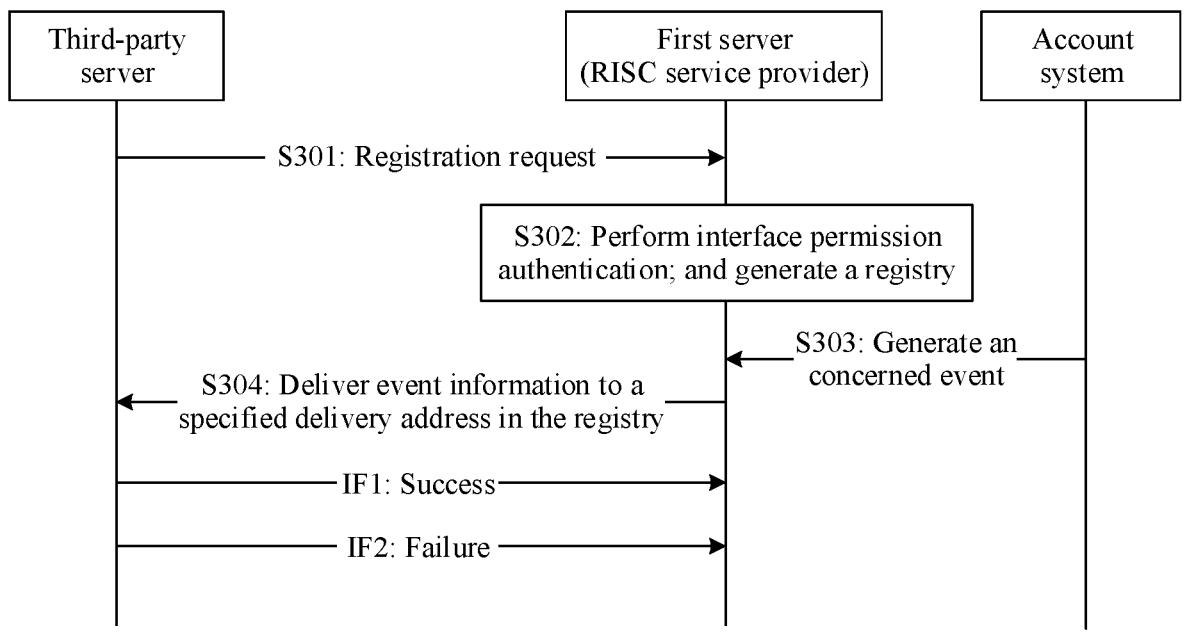
FIG. 3 is a schematic interaction diagram of an existing RISC process.

FIG. 3 is a schematic interaction diagram of an existing RISC process. As shown in FIG. 3, the process mainly includes the following steps.

In step S301, a third-party server sends a registration request to a first server (that is, a RISC service provider). The registration request is used to request to register an event concern registry. Specifically, the third-party server specifies a concerned event type and an event delivery manner in the registration request. The event type concerned by the third-party server herein is an event type that the third-party server is interested in, for example, an event published by the account system in FIG. 2. For details, refer to an event defined in an RISC specification (that is, the RISC standard protocol). Details are not described herein again.

Refer to the existing RISC specification (for details, refer to protocol content in 4.1.2.2 Updating a registry configuration (updating a stream's configuration)), an example of registering a RISC registry (stream) by the third-party server is as follows. A "delivery_method" field specifies an event delivery manner, a "url" field specifies a delivery address, and an "events_requested" field specifies a concerned event type.

```
POST/set/stream HTTP/1.1
Host: transmitter.example.com
Authorization: Bearer eyJ02tlbil61mV4YW1wbGUifQo=
{
    "iss": "https://tr.example.com",
    "aud": [
        "http://receiver.example.com/web",
        "http://receiver.example.com/mobile"
    ],
    "delivery": {
        "delivery_method":
            "https://schemas.openid.net/secevent/risc/delivery-method/push",
        "url": "https://receiver.example.com/events"
    },
    "events_requested": [
        "urn:example:secevent:events:type_2"
        "urn:example:secevent:events:type_3",
        "urn:example:secevent:events:type_4"
    ]
}
```

In step S302, the first server performs interface permission authentication on the registration request, and generates a registry after the authentication succeeds.

Interface permission authentication is also referred to as interface authentication, and is used to authenticate a device identity, to perform access permission control. For example, in the foregoing registry example, a bearer token may be used for authentication. After the first server generates the registry, it indicates that the third-party server performs successful registration.

In step S303, when an event concerned by the third-party server is generated on the account system side, the account system sends event information to the first server. For example, the publishing/subscription system shown in FIG. 2 may be used to release the event information to a DMQ, and the first server obtains the event information through subscription.

In step S304, after obtaining the event information, the first server delivers the event information to a specified delivery address in the registry.

The delivery address herein is a delivery address submitted by the third-party server in the registration request in step S301, for example, a URL "https://receiver.example.com/events" in the "url" field. Specifically, the first server may encapsulate the event information based on an encapsulation data format in the RISC specification, and deliver the encapsulated data to the third-party server based on a delivery address specified in the registry. Correspondingly, the third-party server feeds back, to the first server, that the event information is successfully received or fails to be received.

Before S301, the first server may provide, with reference to the RISC specification, a website for specifying RISC configuration information and public key certificate information, so that the third-party server obtains, by using the website, related information required for registering a RISC service and parsing an event. Details are not described herein again.

In an existing RISC process, after completing interface-level authentication on the registration request sent by the third-party server, the RISC service provider directly generates a registry, and delivers event information based on a delivery address in the registry in a subsequent process. The delivery address in the registry is a delivery address submitted by the third-party server in the registration request. In an existing registration service process, the first server does not authenticate the delivery address. As a result, in step S304, the first server delivers the event information to the unauthenticated delivery address, and then a specific security risk is caused. For example, if the delivery address is a delivery address provided by a malicious attacker, the first server is likely to deliver the event information to an unregistered third-party server, and that an account event is stolen may be caused.

Embodiments of this application provide a service registration method, so that a provider that provides an event delivery service authenticates domain name ownership of the third-party server, and determines that the third-party server has domain name ownership of a domain name in a delivery address, to ensure security and reliability of an event delivery process.

Figure 4:
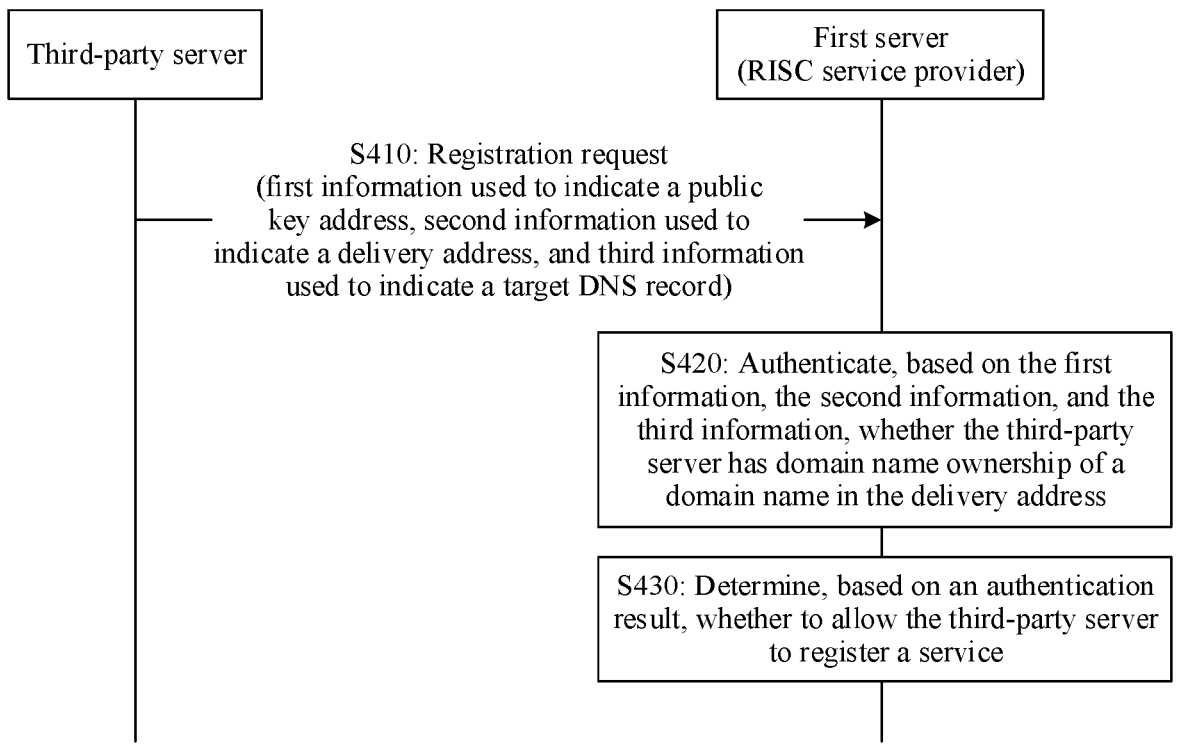
FIG. 4 is a schematic flowchart of a service registration method according to an embodiment of this application.

FIG. 4 shows a service registration method according to an embodiment of this application. The method 400 shown in FIG. 4 may be performed by a server that provides an event delivery service, for example, the first server 110 in FIG. 1 or the first server 220 in FIG. 2. The method 400 includes step S410 to step S430.

In step S410, a third-party server sends a registration request to the first server, to request to register an event delivery service. The registration request includes first information, second information, and third information.

The first information is used to indicate a public key address of the third-party server, and the public key address includes a first domain name.

The first domain name is a domain name in the public key address of the third-party server, and may also be referred to as an authentication domain name in some embodiments. In this embodiment of this application, the third-party server needs to publish a public key of the third-party server in the public key address before step S410. In other words, the third-party server needs to publish the public key of the third-party server in a domain name directory of the third-party server. A private key corresponding to the public key is privately stored by the third-party server.

Optionally, the third-party server may publish at least one public key in the public key address.

The second information is used to indicate a delivery address of event information, that is, an address at which the third-party receive the event information, and the delivery address includes a second domain name.

The second domain name is a domain name in the delivery address, and may also be referred to as a delivery domain name in some embodiments. In this embodiment of this application, whether the third-party server has domain name ownership of the second domain name (that is, the delivery domain name) needs to be authenticated.

The third information is used to indicate a target DNS record on a domain name system DNS server, and the target DNS record includes a digital signature created by the third-party server by using a private key of the third-party server. The public key published by the third-party server in the domain name directory is used to perform authentication on the digital signature. The target DNS record needs to be written into the DNS server by the third-party server in advance.

It should be noted that, only when having the domain name ownership of the second domain name, the third-party server may add, on the DNS server, a DNS record (for example, the A record, the MX record, and the TXT record described above) corresponding to the second domain name, it indicates that the third-party server has a DNS maintain permission for the second domain name.

Optionally, the first information may be carried in a first field.

Optionally, the second information may be carried in a second field.

Optionally, the third information may be carried in a third field.

Optionally, the first field, the second field, and the third field may belong to a same field node, or may belong to at least two field nodes. For example, the first field and the third field belong to a same node, and the second field belongs to another node.

For example, in a RISC service scenario, based on an existing registration request format, the third-party server may further add the first field and the third field to the sent registration request. The first field is used to carry first information, and the first information is used to indicate the public key address of the third-party server. The third field is used to carry third information, and the third information is used to indicate the target DNS record. For ease of understanding, an example in which the third-party server registers a RISC registry may be as follows:

```
{
  "iss": "https://tr.example.com",
  "aud": [
      "https://receiver.example.com/web",
      "https://receiver.example.com/mobile"
  ],
  "verify":{
      "jwks_uri":"httpss://receiver.example.com/jwks.json",
      "lookup_key":"example_key_name"
  }
  "delivery": {
      "delivery_method":
          "https://schemas.openid.net/secevent/risc/delivery-method/push",
      "url": "https://receiver.example.com/events"
  },
  "events_requested": [
      "urn:example:secevent:events:type_2",
      "urn:example:secevent:events:type_3",
      "urn:example:secevent:events:type_4"
  ]
}
```

In the foregoing registry example, an example of the first field is a "jwks_uri" field, and an example of the third field is a "lookup_key" field. The second field may be the same as that in an existing standard, that is, a "url" field, and another field except the first field, the second field, and the third field may be the same as that in the existing standard. Compared with the existing standard, the first field and the third field are new fields, and the first field and the third field may be set under a same node, for example, the "verify" node in the foregoing registry example. In this embodiment of this application, the added first field is used to obtain the public key of the third-party server, and the added third field is used to obtain the target DNS record written by the third-party server into the DNS server. Because the target DNS record includes the digital signature created by the third-party server by using the private key, the public key of the third-party server that is obtained by the first server based on the first field is used to authenticate the digital signature in the target DNS record, to authenticate whether the third-party server has domain name ownership of the domain name in the delivery address. A specific process is described as follows. Details are not described herein.

It should be understood that names of the fields and the nodes in the foregoing examples are merely examples, and may be correspondingly set based on a requirement during actual application. This is not limited in this embodiment of this application. It should be further understood that, for another scenario in which the third-party server registers the event delivery service, specific bearer formats of the first information, the second information, and the third information in the registration request may be correspondingly determined according to an actual protocol or a standard, and are not enumerated herein.

In step S420, the first server authenticates, based on the first information, the second information, and the third information, whether the third-party server has the domain name ownership of the domain name in the delivery address.

In this embodiment of this application, the first server performs authentication on the ownership of the domain name of the third-party server based on the information in the registration request, to reduce a risk that event delivery information is stolen by a malicious device because the event delivery information is delivered to an unauthenticated delivery address can be reduced.

In step S430, it is determined, based on an authentication result, whether to allow the third-party server to register a service.

If the authentication succeeds, it may be considered that the third-party server has legal ownership of the domain name in the delivery address. In this case, the third-party server may be allowed to perform registration.

If the authentication fails, it may be considered that the third-party server does not have the legal ownership of the domain name in the delivery address. In this case, performing registration by the third-party server is rejected.

The following describes in more detail a service registration method provided in an embodiment of this application with reference to FIG. 5 and FIG. 6.

FIG. 5 shows a service registration method according to an embodiment of this application. Refer to FIG. 5. The method 500 is an implementation of the method 400, and the method 500 includes step S510 to step S540.

In step S510, receive a registration request of a third-party server.

The registration request is used to request to register an event delivery service. The registration request includes first information, second information, and third information, where the first information is used to indicate a public key address of a third-party server, and the public key address includes a first domain name; the second information is used to indicate a delivery address of event information, and the delivery address includes a second domain name; and the third information is used to indicate a target DNS record on a domain name system DNS server, and the target DNS record includes a digital signature created by the third-party server by using a private key of the third-party server.

Step S510 is similar to step S410 in the method 400. For related descriptions of the registration request and the first information, the second information, and the third information in the registration request, refer to related descriptions of step S410. For brevity, details are not described herein again.

In step S520, when the first domain name is the same as the second domain name, attempt to obtain a public key of the third-party server based on the first information, and attempt to obtain the target DNS record based on the third information.

In this step, the first server attempts to obtain the public key of the third-party server based on the first information.

As mentioned in step S510, the public key address includes the first domain name, and the delivery address includes the second domain name. The first server may obtain public key information from the public key address based on a public key address indicated in the first information. It should be understood that, for the first server, the first server does not know whether the obtained public key is actually the public key of the third-party server. Therefore, in this embodiment of this application, the "public key of the third-party server" may be understood as that the public key is considered, from a perspective of the first server, a public key of a device that sends a registration request. A real correspondence between the public key and the third-party server is not limited. In this embodiment of this application, whether the third-party server has domain name ownership of the second domain name in the delivery address needs to be authenticated, and a connection between the third-party server and the second domain name may be established by using the first domain name. Specifically, the first domain name is a domain name in the public key address of the third-party server, and the public key of the third-party server is published in a first domain name directory. When the first domain name is the same as the second domain name, a source of the public key of the third-party server is the same as the second domain name, and a public key certificate may be used to prove whether the third-party server has a validity authentication capability. In other words, the public key certificate may prove that the first domain name has a correspondence with a server that publishes a public key. If the second domain name is the same as the first domain name, it may prove that the second domain name in the delivery address has a correspondence with the server that publishes the public key, provided that whether the third-party server has domain name ownership of the first domain name corresponding to the public key is authenticated.

When the first domain name is different from the second domain name, a spoofing risk may exist. For example, the first information is sent by a real third-party server, but the second information may be provided by a malicious attacker. In this way, the domain name in the public key address is usually different from the domain name in the delivery address.

Therefore, optionally, when the first domain name is different from the second domain name, it is determined that the third-party server is not allowed to perform registration. The first server directly rejects the registration performed by the third-party server, so that the foregoing spoofing risk can be avoided.

Optionally, the third-party server may publish one or more public keys in the public key address. When a plurality of public keys are queried based on the first information, an event delivery service provider, for example, the foregoing first server, may use, based on an indication of the third-party server, a public key corresponding to the private key used by the third-party server to create the digital signature.

There are a plurality of public key indication manners. For example, the third-party server may be indicated in the target DNS record, or may be indicated in the registration request, or may send a separate message for indication. In some embodiments, the third-party server and the first server may also use and obtain a corresponding public-private key pair based on a preset rule.

Optionally, the third-party server may indicate, by using an identifier of the public-private key pair, an identifier of the public key, or an identifier of the private key, the first server to obtain a specific public key and use the public key to perform subsequent signature authentication.

Optionally, in this step, if the public key information is not obtained based on the first information, it is considered that the third-party server does not provide the public key certificate based on an agreement and does not have a validity authentication capability, and the third-party server may be directly rejected for performing registration. That is, when the public key of the third-party server is not obtained, it is determined that the third-party server is not allowed to perform registration. In this way, the following spoofing risk can be avoided. For example, the malicious attacker provides a same domain name in both the first information and the second information, but the malicious attacker does not publish a public key in a corresponding domain name directory.

In this step, the first server obtains the target DNS record based on the third information.

Optionally, the third information may include a keyword corresponding to the target DNS record. In this way, the DNS server may be queried, based on the keyword, whether there is the target DNS record in the second domain name (that is, the first domain name).

It should be understood that, only whether the target DNS record exists can be queried by using the keyword, and whether the record has content and what the content is specifically are unknown. Whether the target DNS record has content needs to be determined by extracting data from the target DNS record, and signature authentication is performed by using the obtained public key to determine what the data in the target DNS record is.

In this step, the first server may query, by using a domain name resolution tool such as an nslookup command, a DNS server corresponding to the second domain name for whether there is a DNS record corresponding to the keyword.

In some embodiments, "obtaining the target DNS record" includes: querying the DNS server for the target DNS record based on the keyword; and obtaining the digital signature in the target DNS record.

Optionally, in this step, if the target DNS record is not obtained based on the third information, for example, the first server queries the DNS server for the target DNS record, or does not obtain the digital signature in the target DNS record, it is considered that the third-party server does not have a DNS maintenance permission for the second domain name (that is, the first domain name), that is, does not have a legal ownership permission. That is, when the target DNS record is not obtained, or when the digital signature is not obtained, it is determined that the third-party server is not allowed to perform registration. In this way, the following spoofing risk can be avoided. For example, the third-party server is a real registration service initiator, but the malicious attacker provides a spoofing domain name. Therefore, a service provider queries the DNS server for the target DNS record under the domain name provided by the malicious attacker. Because the third-party server writes the target DNS record into a domain name of the third-party server, if the malicious attacker does not add the target DNS record to the domain name provided by the third-party server, the service provider cannot query the target DNS record. Therefore, it may be considered that the third-party server does not have ownership of the domain name.

It should be understood that, in this embodiment of this application, the process of obtaining the public key of the third-party server and the process of obtaining the target DNS record in step S520 may be performed successively, or may be performed at the same time. This is not specifically limited herein. When the process of obtaining the public key is performed before or at the same time as the process of obtaining the target DNS record, if the third-party server publishes the plurality of public keys, the first server may obtain all the plurality of public keys, and then determine, from the plurality of public keys based on a public key indication in the target DNS record, a public key used to authenticate the digital signature. When the process of obtaining the public key is performed after the process of obtaining the target DNS record, if the third-party server publishes the plurality of public keys, the first server may directly obtain, from the public key address based on a public key indication in the target DNS record, a public key used to authenticate the digital signature.

It should be further understood that, in a process in which the first server performs step S520, if the first server does not obtain a corresponding result, the first server may directly end the operation process, and reject the current registration request of the third-party server this time. That is, when the public key of the third-party server and/or the target DNS record are/is not obtained, it is determined that the third-party server is not allowed to perform registration.

In step S530, when the public key of the third-party server and the target DNS record are obtained, perform signature authentication on the digital signature in the target DNS record based on the public key of the third-party server, to obtain a signature authentication result.

There are a plurality of forms of the digital signature in the target DNS signature.

For example, the target DNS record may include the digital signature created by using the private key of the third-party server, and an original text before encryption is indicated to the service provider (that is, the first server) in the registration request.

For another example, the digital signature in the target DNS record may be in a JWT form. That is, the target DNS record may include a JWT, and the JWT includes the digital signature created by using the private key of the third-party server. Because the JWT is a self-contained access token, the public key of the third-party server may be used to perform signature authentication after the target DNS record is obtained.

For ease of understanding, the following briefly describes the JWT.

The JWT is a simple and URL-secure declaration specification for transferring security information between communication parties, and is often used for cross-domain authentication. The JWT is essentially a credential (Token) for accessing a resource, and is not intended to hide or keep data confidential, but to ensure that the data is created by an authorized person to prevent tampering.

The JWT includes three character strings and two dots (.). The format is Header.Payload.Signature (for example, xxxxxx.yyyyyy.zzzzzz) There is no line break between two character strings. Each character string represents a different function.

1. Header (Header)

The header is a JSON object, and mainly carries two parts of information: a declaration type (token type) and a declaration encryption algorithm. The declaration type is JWT, and the declaration encryption algorithm is usually HMAC SHA256. In some embodiments, a signature algorithm may also use an asymmetric encryption algorithm such as RSA or ECDSA.

For example, a header character string may be json{"alg": "HS256","typ":"JWT"}. An alg attribute herein indicates an algorithm used for a signature. A default algorithm of a JWT signature is HMAC SHA256, and an alg attribute value HS256 is the HMAC SHA256 algorithm. A typ attribute indicates a token type, which is the JWT herein. The header is encrypted by using base64 (the encryption can be symmetrically decrypted) to form a first part of the JWT.

2. Valid Payload (Payload)

A payload is a place in which valid information is stored. The valid payload is also a JSON object, and is a body of the JWT. The valid payload mainly includes three parts: a standard registered (registered) declaration, a public (public) declaration, and a private (private) declaration.

The standard registered declaration generally includes the following content: (1) iss: an issuer/issuer of the JWT; (2) sub: a user of a subject or JWT; (3) aud: a receiver; (4) exp: an expiration time point of the JWT; (5) nbf: an effective time point of the JWT; (6) iat: an issuance time point of the JWT; and (7) jti: a unique identifier of the JWT, which is mainly used as a one-off token to prevent a replay attack. Any information may be added to the public declaration. Generally, user information and service information are added. The public declaration may be decrypted on a client. The private declaration is defined by both the server and the client. The private declaration may be classified as plaintext information. The standard registered declaration is not mandatory. In addition, the public declaration and the private declaration are encrypted symmetrically. Therefore, it is not recommended that sensitive information be stored. The valid payload is encrypted by using base64 (which can be decrypted symmetrically) to form a second part of the JWT.

3. Hash Signature (Visa (Signature) Information)

An algorithm of the hash signature mainly ensures that data is not tampered with. The hash signature mainly signs the two parts mentioned above, and generates a hash by using the algorithm defined by the JWT header. A general process of the hash signature is as follows: (1) Specify a password (secret, that is, private key). The password is stored only on the server and cannot be disclosed to the user. (2) base64 encoding is performed on the JWT header and the valid payload, and encoded results of the JWT header and the valid payload are connected by using (.), and are respectively used as the first part (for example, xxxxxx) and the second part (for example, yyyyyy) of the JWT string. (3) An algorithm specified in the JWT header is used for signature, that is, the encryption algorithm declared in the header is used to encrypt the character string (for example, xxxxxx.yyyyyy) obtained in step 2 by using a salted key combination to form a third part (for example, zzzzzz) of the JWT.

After a signature hash is calculated, the encoded JWT header, the encoded valid payload, and the hash signature are combined into a character string. Each part is separated by a period (.) to form the entire JWT object (for example, xxxxxx.yyyyyy.zzzzzz) A signature is used to authenticate whether a message is changed during transmission. For a token signed by using a private key, the token may further authenticate whether a sender of the JWT is a sender the token refers to.

Optionally, the JWT may include an identifier of a third-party developer corresponding to the third-party server or an application identifier (which may be denoted as client_id) corresponding to the third-party server. The application identifier is used to identify a third-party application corresponding to the third-party server. The third-party application identifier or the identifier of the third-party developer identifier corresponding to the third-party server may be used to uniquely identify a third-party application (or a website), and is used to authenticate whether the third-party server holds information about the corresponding third-party application. For example, the "aud" field in the JWT may include the foregoing information.

Optionally, the JWT includes a third domain name, and the third domain name is used to indicate an issuer of the JWT. In some embodiments, the third domain name may also be referred to as an issuer domain name, that is, a domain name of the third-party server. For example, "iss" in the JWT indicates the issuer of the JWT. Therefore, the "iss" field includes the issuer domain name.

Optionally, information included in the "sub" field in the JWT may be the same as information in the "aud" field. Content of another field in the JWT may be defined based on an actual requirement or based on a JWT standard.

In a process in which the first server performs signature authentication on the digital signature in the JWT, the first server may decrypt the hash signature in the JWT by using the public key obtained in step S520, to obtain the encoded header and the encoded valid payload. By comparing decrypted data with data in the header and the valid payload of the JWT, it can be authenticated whether the sender of the JWT is the third-party server and whether signature data is tampered with.

In some embodiments, a process in which the first server performs signature authentication on the digital signature in the target DNS record may specifically include: extracting an authentication string from the target DNS record; and when the authentication string is extracted, performing signature authentication on the authentication string based on the public key of the third-party server.

Therefore, optionally, when the authentication string is not extracted, it is determined that the third-party server is not allowed to perform registration. In this way, the following spoofing risk can be avoided. The malicious attacker writes the keyword corresponding to the target DNS record on the DNS server by guessing, but does not write the signature data.

In step S540, determine, based on the signature authentication result, whether to allow the third-party server to perform registration.

This step is a signature authentication process, that is, whether the digital signature in the target DNS record is created by the third-party server and whether the signature data is tampered with are authenticated.

If the digital signature in the target DNS record is created by the third-party server and is not tampered with, the signature authentication result succeeds, and it is determined that the third-party server is allowed to perform registration. If the digital signature in the target DNS record is not created by the third-party server, or the signature data is tampered with, the signature verification result is that the signature verification fails, and it is determined that the third-party server is not allowed to perform registration.

This step may involve the following cases:

Case 1: If the third-party server is real, and the information in the registration request is not maliciously tampered with, both the public key and the target DNS record that are obtained after step S520 are real. In this step, the public key of the third-party server is used to authenticate the digital signature in the target DNS record. If the signature authentication succeeds, it can be proved that the third-party server has the domain name ownership of the second domain name.

Case 2: The third-party server is a malicious third party. The malicious third party steals a DNS content editing permission corresponding to a delivery domain name and a corresponding public key. In some cases, the malicious third party adds a DNS record on the DNS server by guessing the keyword corresponding to the target DNS record. However, because the malicious third party does not know the private key corresponding to the public key, signature authentication cannot be succeeded in this step. In this case, it is considered that the third-party server does not have the domain name ownership of the second domain name, and registration performed by the third-party server may be rejected. In this way, security in an event delivery process can be effectively improved.

According to the service registration method provided in this embodiment of this application, in a process in which the third-party server registers the event delivery service, legal ownership of a domain name specified by the third-party server for the delivery address is authenticated. By authenticating whether the third-party server has a DNS record addition permission and authenticating the signature of the third-party server, security in the event delivery process can be effectively improved. When the first server determines that the third-party server does not have domain name ownership of the domain name in the delivery address, the first server may reject the third-party server to register a service. In this way, spoofing can be avoided, a risk of stealing a delivery event is reduced, security and reliability of the event delivery process are ensured, and security of sharing the event information by the first server with the third party is improved.

In the service registration method provided in FIG. 5, because the first server performs authentication on the legal ownership of the domain name in the delivery address by the third-party server, compared with the conventional technology, security of the event delivery process is greatly improved, and most spoofing problems can be avoided. It is already very difficult for the malicious attacker to pass step S540.

To further improve security of an event delivery process, an embodiment of this application further provides a service registration method. The following describes the method with reference to FIG. 6. The method 600 shown in FIG. 6 is an implementation of the method 400. The method 600 includes step S610 to step S650.

In step S610, receive a registration request of a third-party server.

The registration request is used to request to register an event delivery service. The registration request includes first information, second information, and third information. The first information is used to indicate a public key address of the third-party server, and the public key address includes a first domain name. The second information is used to indicate a delivery address of event information, and the delivery address includes a second domain name. The third information is used to indicate a target DNS record on a domain name system DNS server, and the target DNS record includes a digital signature created by the third-party server by using a private key of the third-party server and an application identifier corresponding to the third-party server.

Step S610 is similar to step S510 in the method 500. For details, refer to related descriptions of step S510. Only a difference is described below.

In this embodiment of this application, the third-party server may register an account before registering the event delivery service. The account has an association relationship with a third-party application (or a website) corresponding to the third-party server. For example, in an account registration process, the third-party server provides a domain name corresponding to the third-party application, and may obtain an identifier (which may also be denoted as a client ID in some embodiments) of the third-party application after successful registration. The identifier of the application is used to identify the third-party application.

In this embodiment of this application, the target DNS record includes the application identifier corresponding to the third-party server. The first server may obtain, based on the application identifier, a redirection address generated by a party that provides an account registration service when the third-party server registers the account. The redirection address includes the domain name of the third-party application corresponding to the third-party server. The following provides detailed descriptions with reference to step S610. Details are not described herein.

In step S620, when the first domain name is the same as the second domain name, attempt to obtain a public key of the third-party server based on the first information, and attempt to obtain the target DNS record based on the third information.

Step S620 is similar to step S520 in the method 500. For details, refer to related descriptions of step S520. Details are not described herein again.

In step S630, when the public key of the third-party server and the target DNS record are obtained, perform signature authentication on the digital signature in the target DNS record based on the public key of the third-party server, to obtain a signature authentication result.

Step S630 is similar to step S530 in the method 500. For details, refer to related descriptions of step 530. Details are not described herein again.

In step S640, when the signature authentication result succeeds, obtain, based on the application identifier corresponding to the third-party server, a redirection address of the application corresponding to the third-party server. The redirection address includes a fourth domain name.

In this step, the first server may obtain the application identifier corresponding to the third-party server from the target DNS record. The application identifier is used to identify the application corresponding to the third-party server. The first server may obtain, based on the application identifier, the redirection address of the application (that is, the third-party application) corresponding to the third-party server, that is, the redirection address corresponding to the third-party application. The redirection address includes the fourth domain name. The fourth domain name is the domain name corresponding to the third-party application, and may also be referred to as a trusted application domain name in this embodiment of this application.

Optionally, when the signature authentication result fails, it is determined that the third-party server is not allowed to perform registration.

In step S650, when the second domain name is the same as the fourth domain name, determine to allow the third-party server to perform registration.

In other words, compared with the method 500, in addition to performing signature authentication on the digital signature in the target DNS record, authentication performed by the first server on domain name ownership of the third-party server may further include:

authenticating whether the second domain name in the second information is consistent with the trusted application domain name of the third-party application.

If yes, another step continues to be performed, for example, it is determined that the third-party server is allowed to perform registration. If no, a spoofing risk may exist, and the first server may directly reject the registration request of the third-party server, that is, when the second domain name is different from the fourth domain name, it is determined that the third-party server is not allowed to perform registration.

The trusted application domain name of the third-party application is a domain name in a redirection address (redirect_uri) corresponding to the third-party application, and is submitted to an account system (for example, the account system in FIG. 2) in a process in which the third-party server registers an account or in a process in which the third-party server is authorized. In a process of registering the event delivery service, the first server may obtain the redirection address or the trusted application domain name in the redirection address from the account system, and then perform the foregoing authentication on the second domain name and the trusted application domain name (that is, the fourth domain name). It should be understood that the redirection address (redirect_uri) is equivalent to a URL of an application, and is configured in a background of a device and cannot be changed. In this embodiment of this application, whether the second domain name is consistent with the domain name in the redirection address (redirect_uri) is authenticated, so that whether the second domain name is a spoofing domain name can be determined. In this way, on a basis of determining that a delivery domain name is indeed the domain name of the third-party application registered on the first server side, it may be determined that the third-party server has ownership of the delivery domain name, so that the event information can be prevented from being delivered to a third party that has not registered an account on the first server, thereby improving security of the event delivery process.

Optionally, the authentication performed on the domain name ownership of the third-party server may further include:

Whether an issuer domain name (that is, a third domain name) in a JWT, an authentication domain name (that is, the first domain name) in the first information, and a delivery domain name (that is, the second domain name) in the second information are consistent with the trusted application domain name (that is, the fourth domain name) in the redirection address corresponding to the third-party application (or website) is authenticated.

If yes, another step continues to be performed. If no, a spoofing risk may exist, and the first server may directly reject the registration request of the third-party server.

In the service registration method provided in FIG. 6, a connection between the third-party server and a domain name in the delivery address is established by submitting a domain name of a public key address in the registration request, to determine, by authenticating whether the third-party server has legal ownership of the domain name in the public key address, whether the third-party server has legal ownership of the domain name in the delivery address. In some other embodiments, the third-party server may not submit, in the registration request, the first information used to indicate the public key address, or perform a subsequent step only when the first domain name is not limited to be the same as the second domain name. The first server may directly perform the foregoing "authenticating whether the second domain name in the second information is consistent with the trusted application domain name of the third-party application", to establish the connection between the third-party server and the domain name in the delivery address.

It should be understood that, in this embodiment of this application, an authentication result obtained by the first server by using the method 600 includes at least one of the following aspects:

1. The signature is authenticated, that is, whether the digital signature in the target DNS record is created by the third-party server and whether signature data is tampered with are authenticated;

2. Whether the first domain name in the first information (or the second domain name in the second information) is consistent with the trusted domain name (that is, the fourth domain name) of the third-party application corresponding to the third-party server is authenticated; and 3. Whether the issuer domain name (that is, the third domain name) in the target DNS record, the first domain name and the second domain name in the registration request, and the trusted domain name (that is, the fourth domain name) of the third-party application are consistent is authenticated.

When the authentication result includes at least two aspects, as long as one aspect of the authentication result is no, it is considered that the authentication fails.

After the authentication succeeds, when an account event concerned by the third-party server is generated, the first server may deliver, based on an existing process, account event information to the delivery address provided by the third-party server during registration, that is, deliver the account event information to the third-party server.

According to the service registration method provided in this embodiment of this application, in the process in which the third-party server registers the event delivery service, legal ownership of a domain name specified by the third-party server for the delivery address is authenticated. By authenticating whether the third-party server has a DNS record addition permission and authenticating the signature of the third-party server, security in the event delivery process can be effectively improved. When the first server determines that the third-party server does not have domain name ownership of the domain name in the delivery address, the first server may reject the third-party server to register a service. In this way, spoofing can be avoided, a risk of stealing a delivery event is reduced, security and reliability of the event delivery process are ensured, and security of sharing the event information by the first server with the third party is improved. In addition, delivering the event information to a third party that does not register an account with the first server can be avoided.

Figure 7A:
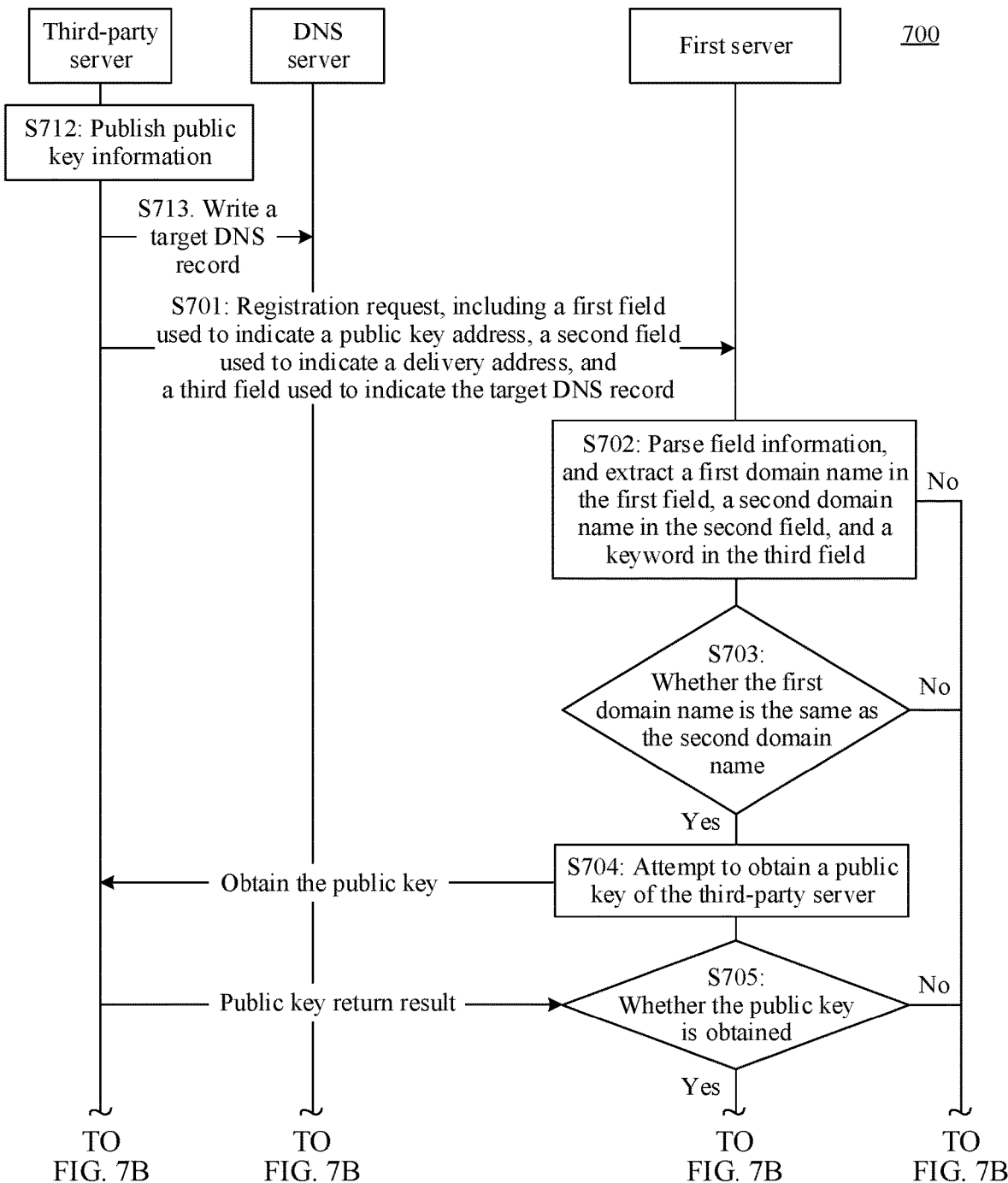
FIG. 7A and FIG. 7B are a schematic interaction diagram of a service registration method according to an embodiment of this application.
Figure 7B:
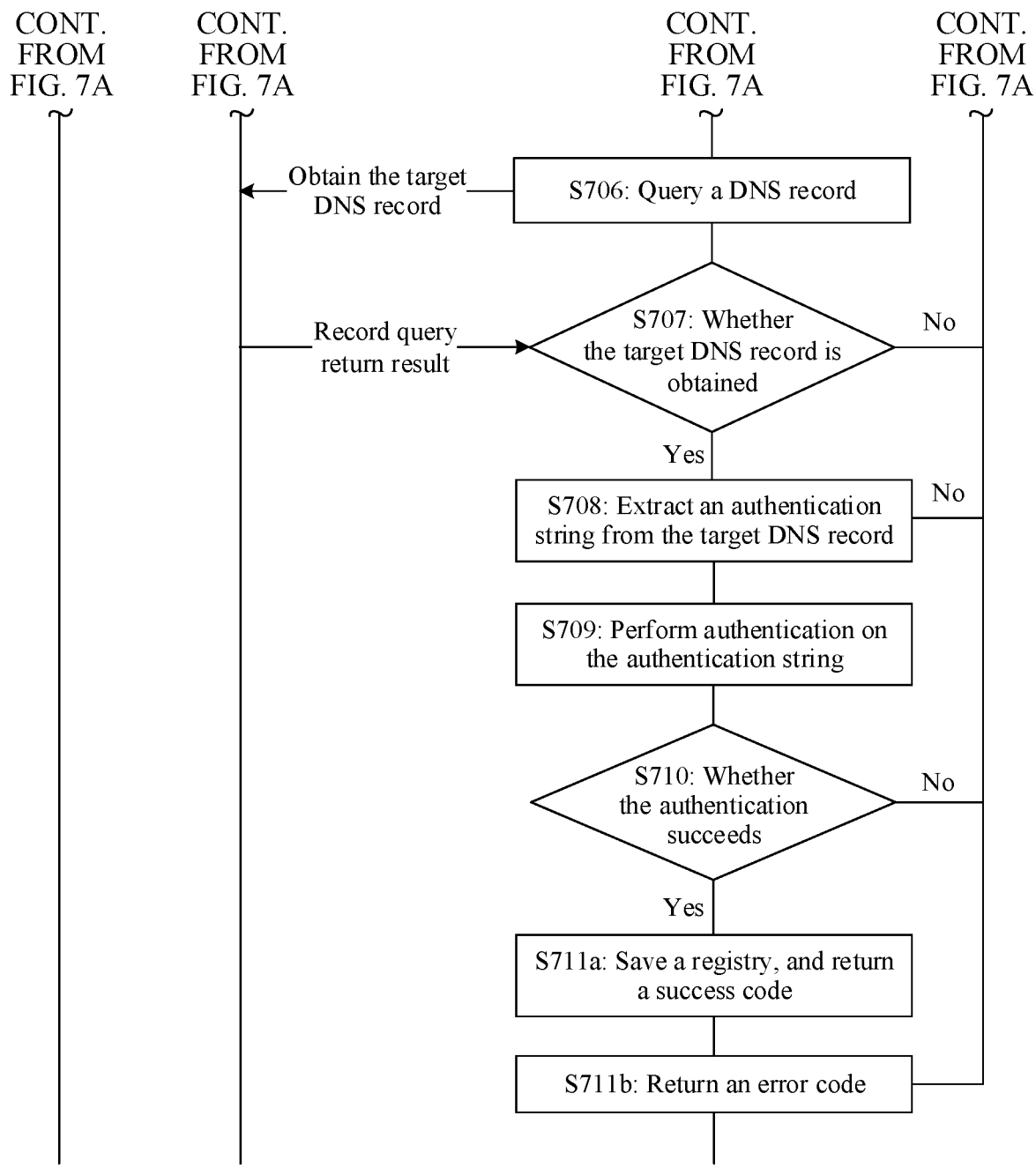

The following describes some specific and non-limiting examples of an embodiment of this application in more detail with reference to FIG. 7A and FIG. 7B. In this embodiment of this application, an example in which a third-party server registers a RISC service is used for description. However, as described above, a method provided in this embodiment of this application may also be applied to a scenario in which the third-party server registers another event delivery service. The method 700 shown in FIG. 7A and FIG. 7B is mainly applied to the architecture that includes the first server and the third-party server in FIG. 1 or 2. The method 700 includes step S701 to step S711a (or step S711b).

In step S701, the third-party server sends a registration request to the first server.

The first server may be a device that provides a service such as message pushing or event delivery. A message type or an event type pushed by the first server may be correspondingly determined based on a service provided by the first server. The registration request is used to request to register a service that can be provided by the first server. For example, the first server may be a device providing the RISC service, that is, the first server may provide account risk event information. Correspondingly, the registration request is used to request to register the RISC service.

The registration request may include a first field, a second field, and a third field. The first field is used to indicate a public key address of the third-party server, the second field is used to indicate a delivery address of event information, and the third field is used to indicate a target DNS record.

For example, in a process of sending the registration request, the third-party server may submit a registry to the first server according to a RISC protocol. The registry is an event concern registry, and includes information about the event type concerned by the third-party server, for example, account disabling, account freezing, and credential revocation.

For ease of understanding, an example of the registry is as follows:

```
{
  "iss": "https://cloud.example.com",
  "aud": [
    "https://cloud.example.com/web",
    "https://cloud.example.com/mobile"
  ],
  "verify": {
    "jwks_uri":"https://cloud.example.com/jwks.json",
    "lookup_key":"verify_key"
  }
  "delivery": {
    "delivery_method":
      "https://schemas.openid.net/secevent/risc/delivery-method/push",
    "url": "https://cloud.example.com/rc/events"
  },
  "events_requested": [
    "https://schemas.openid.net/secevent/oauth/event-type/tokens-revoked",
  ]
}
```

In the foregoing registry example, the "iss" field is used to indicate an owner of the third-party server, or may be understood as a provider of a third-party website or a third-party application, and the field may specifically include a domain name corresponding to the third-party application or the third-party website. The "aud" field is used to indicate a receiver of event delivery information. For example, if the third-party server is an application server, and is configured to provide a service for the third-party application, the field may include a client address and/or a web page address of the third-party application. If the third-party server is a web server, and is configured to provide a service for the third-party website, the field may include a web page address of the third-party website. The "jwks_uri" field under the "verify" node is the first field, and is used to indicate the public key address of the third-party server. Generally, the third-party server needs to publish at least one public key of the third-party server in a domain name directory of the third-party server in advance. The first server may obtain, based on the registration request, a public key corresponding to a private key used by the third-party server for signing. The public key is used for subsequent signature authentication. The "lookup key" field under the "verify" node is the third field, and is used to indicate the target DNS record. The field may specifically include a keyword corresponding to the target DNS record. For example, a keyword corresponding to the target DNS record may be "verify key", and the first server may query a DNS server for a DNS record corresponding to the name "verify_key". The "delivery_method" field under the "delivery" node indicates a manner of obtaining a message. There may be two manners in which the third-party server obtains a message from the first server. One manner is that the first server actively pushes or delivers the message to the third-party server, and this manner is referred to as push. The other manner is that the third-party server actively pulls the message from the first server side, and this manner is referred to as pull. For example, in this embodiment of this application, the third-party server obtains event information in the push manner. The "url" field under the "delivery" node is the second field, and is used to indicate a delivery address, that is, indicate the first server delivers the message to a specific address. The "events_requested" field is used to indicate an event concerned by the third-party server. The third-party server may concern one or more events. Correspondingly, the field includes information about all events that the third-party server wants to concern.

For example, the third-party server is the application server. Information included in the foregoing registry is as follows. A third-party application service provider (for example, cloud.example.com) submits a concern credential revocation (https://schemas.openid.net/secevent/oauth/event-type/tokens-revoked) event to a RISC service provider, and expects the RISC service provider to deliver the credential revocation event to the https://cloud.example.com/rc/events method when discovering the credential revocation event, so that the third-party application service provider (for example, cloud.example.com) quickly responds to an account security message and takes a corresponding protection measure (for example, logging out of an account).

It should be understood that the registration request sent by the third-party server further includes other information. For details, refer to a protocol implementation corresponding to a registration service. Details are not described herein again.

In step S702, after the first server receives the registration request sent by the third-party server, the first server may first parse field information, and then extract the first domain name in the first field, the second domain name in the second field, and the keyword in the third field.

Herein, the first domain name may also be referred to as an authentication domain name, and the second domain name may also be referred to as a delivery domain name.

If in this step, the first server does not extract at least one of the first domain name, the second domain name, and the keyword, the first server may directly perform step S711b, and return an error code.

Herein, that the first server does not extract at least one of the first domain name, the second domain name, and the keyword may be that there is no corresponding field in the registration request. In this case, the first server may not perform the following domain name ownership authentication step, but directly return the error code, thereby rejecting the registration request of the third-party server this time.

If the first server extracts corresponding information in this step, a next step is performed.

In this step, if a malicious device sends the registration request, but does not carry the foregoing information in the registration request according to an agreement, the first server may reject the registration of the malicious device in this step, to prevent the event information from being stolen.

For example, the third-party server sends the registry shown in step S701. The first server may parse the field information in the registry according to the protocol, and obtain "verify" node information (mainly including "jwks_uri" and "lookup_key" information) and "delivery" node information (mainly including "url" information). Herein, the first server parses and extracts that the "jwks_uri" information is "https://cloud.example.com/jwks.json", the "lookup_key" information is "verify_key", and the "url" information is "https://cloud.example.com/rc/events".

Next, the first server extracts the first domain name "cloud.example.com" from the first field (that is, the "jwks_uri" field), extracts the second domain name "cloud.example.com" from the second field (that is, the "url" field), and extracts the keyword "verify_key" from the third field (that is, the "lookup_key").

In step S703, the first server determines domain name consistency, and determines whether the first domain name is the same as the second domain name.

If the first domain name is different from the second domain name, it indicates that a domain name used by a holder of a public key certificate is inconsistent with a domain name used in a method that needs to be delivered. In this case, a spoofing risk may be caused. Therefore, when this case is detected, step S711b may be directly performed to return the error code, and the registration request of the third-party server is rejected this time.

If the first domain name is the same as the second domain name, that is, a domain name in the public key address of the third-party server is the same as a domain name in the delivery address, it indicates that the holder of the public key certificate is the same as the domain name used in the method that needs to be delivered, and a next step may be performed.

In this step, if the registration request is sent by a real third-party server, but the second field used to indicate the delivery address in the registration request is changed by the malicious device, or the malicious device steals the registration request but changes only the second field. In this way, a domain name used to indicate a public key address of the real third-party server is different from the domain name in the delivery address, the first server may reject the registration of the malicious device in this step, to prevent the event information from being stolen.

For example, the first domain name and the second domain name extracted by the third-party server are the domain names shown in step S702. Because the first domain name is "cloud.example.com" and the second domain name is "cloud.example.com", the two are the same, so that it indicates that a domain name for publishing the certificate and the domain name in the delivery method are held by a same holder.

In step S704, the first server attempts to obtain the public key of the third-party server based on a public key address indicated by the first field.

In this step, the first server obtains the public key of the third-party server for subsequent signature authentication. The following provides descriptions with reference to step S709. Details are not described herein.

For example, the first field is the example provided in step S701. The first server attempts, by using http or https, to obtain, based on a uniform resource locator URL specified in the first field (that is, the "jwks_uri" field), public key information provided by the third-party server.

Therefore, before this step, the third-party server needs to perform step S712 in advance: publish the public key information. Specifically, the third-party server publishes a public key in the domain name directory of the third-party server, that is, a website address of the first field provided in the registration request. For ease of understanding, an example of a public key publication format is as follows:

```
{
    "keys": [{
        "alg": "RS256",
        "e": "AQAB",
        "kid":
"9a39872d80bbd8c8143455e73c75fc0808985ela1da2e7a280c3444d529a9e9e",
        "kty": "RSA",
        "n":
"ALegOzZZkEtgbN7TFmQdbfAQfnviMOfOJD-3s3POBD2ZGsSWxWRXXpiDU_IVOg0Q
WT0dA9eoYb65jaWxw6nrkJUHrPVkUz8OsTPdXn_LYkbkijtC5uqA5hWibN8uPopYRVkcI
tlfnSnS6yft-hootj1RQXQJ09cWkr97RswOqBJBMxAEdB_w1NGhv6w0jyNu4ZuRoVQVbp
nOwBG4Y_wLLqaQ-IFsQvRLvLGwFd9U-Exrxi-yeUXiWN7FpyR06fkr4M8UWhXR8XhG
CfqZuOnqfwGqg373c_BXptZiz_0Her88Nf3N7cPzlekV-Dwou7LcsZO1NB6LiYuoCRpU5tJ6
LFc",
        "use": "sig"
    }, {
        "alg": "RS256",
        "e": "AQAB",
        "kid":
"b3fa7b62cd6f60a575b25e516842d2aab08427e9c4a834684f5763945a058231",
        "kty": "RSA",
        "n":
"AMvDDGcnjoGYa248s1Edor06VsUexUdViEOQCDxwuxdbcOwOJYiQauWdAtYO73s3mE-
Up83tXUDLdzWQ_7rEda95q4J8dXRLlsIdq7eWh6Go33twaxbVw48JdZuup8OhfwyYKF51o
j3kJHmHOH3vSwpi4apW-uS3_fFqpEPLwGJPtmvvjXMntpZv0BqOKIOImlZsubytfFNpDC8
cq7_ht2AEECn1kKtcL0yEi_QmlCvbIRfESVEhSF5-Sp0HZBkfcvotn2zY30N737_JMjSzic2jJr
8AQIljscfKId_g93vd8sNuEgC3vNRxhPoemuP9LBsXiM8y7AQpeZ65VH3n0V8",
        "use": "sig"
    }]
}
```

In the foregoing example of the public key publication format, the "alg" header parameter is used to indicate an encryption algorithm for protecting an ID token. For example, a third-party server signature algorithm is an RS256 (that is, RSA-SHA256) encryption algorithm, and certainly may alternatively use another message signature algorithm such as HS256 (HMAC-SHA256) or ES256 (ECDSA-SHA256). The "kty" parameter identifies an encryption algorithm series used in combination with a key, for example, "RSA" shown in this embodiment of this application, that is, a key type parameter. The "e" parameter includes an exponent value of an RSA public key, which is represented as a value encoded by using Base64urlUInt. The "n" parameter includes a modulus value of the RSA public key, which is a value encoded by using Base64urlUInt. "kid" is a prompt indicating which keys are used to protect a signature of a token (that is, JSON web signature (JWS)), that is, used to indicate a public key identifier. The "use" parameter indicates an expected use of the public key. For example, in this application example, a "use" value "sig" indicates a signature. It should be understood that the public key publication format may alternatively be another form or include other field information, and may be specifically determined according to a corresponding protocol specification. Details are not described herein again.

The third-party server may publish at least one public key. For example, in the foregoing public key publication format, two public keys are published. When the third-party server publishes a plurality of public keys, the third-party server may indicate, in some manners, the public key corresponding to the private key used by the third-party server, for example, separately sending indication information to the first server, or including indication information in the registration request. The following provides specific descriptions with reference to step S709. Details are not described herein.

In step S705, the first server determines, based on a public key return result, whether a public key is obtained.

If the public key return result does not include the public key information of the third-party server, in this step, the first server cannot obtain the public key of the third-party server, and it may be considered that the third-party server does not provide a public key certificate based on a protocol agreement, and does not have a validity authentication capability. In this case, the first server may directly perform step S711b, return the error code, and reject the registration request of the third-party server this time.

If the public key return result includes the public key information of the third-party server, in this step, the first server can obtain the public key of the first server, and it indicates that the third-party server provides the public key certificate based on the protocol agreement, and a next step is performed.

In the foregoing steps, if the registration request is sent by the malicious device, and the malicious device changes the authentication domain name and the delivery domain name in the first field and the second field in the registration request to be consistent, but the malicious device does not publish the public key in the website corresponding to the first field, that is, step S712 is not performed. In this step, if the first server fails to obtain the public key, the first server may reject registration of the malicious device, to prevent the event information from being stolen.

For example, the third-party server sends the registry shown in step S701. The first server obtains, by using http or https, the public key information provided by the third-party server based on a URL: https://cloud.example.com/jwks.json specified by the first field (that is, the "jwks_uri" field). The third-party server publishes the at least one public key in step S712. The first server may obtain the at least one public key. For example, the first server obtains the public key shown in step S704. It should be understood that this embodiment of this application is described from a perspective of the first server. The first server does not know up to this point whether the device registering the service is the real third-party server or the malicious device. Therefore, the public key obtained by the first server is the public key of the third-party server by default, and is used for subsequent signature authentication.

In step S706, the first server queries a DNS record of the third-party server.

In this step, the first server attempts to obtain the target DNS record based on the keyword in the third field.

The DNS record can be added to a domain name system DNS only when domain name ownership is obtained for a domain name. Therefore, in this embodiment of this application, whether the third-party server has the domain name ownership is determined by determining whether the third-party server can add the target DNS record to the DNS.

Therefore, the third-party server needs to perform step S713 in advance to write the target DNS record into the DNS server. In this embodiment of this application, a value in the target DNS record is a JWT.

In this embodiment of this application, in a JWT component of the target DNS record, an example of a valid payload (payload) is: "iss" in a standard registration declaration is an issuer of the JWT. By using the registry example provided in step S701 as an example, "iss" may be a domain name (for example, cloud.example.com) in a delivery address under the "delivery" node, that is, "iss" is set to a domain name of the third-party server, or may be referred to as an issuer domain name; "sub" is a user to which the JWT is oriented, and may be, for example, "aud" (that is, a receiver) in the foregoing valid payload; and "aud" is an application identifier (client_ID) corresponding to a third-party server in interface-level authentication (OAuth) performed on the registration request, or a unique identifier of a third-party developer, for example, a third-party developer account (user ID, UID), and is used to authenticate whether the third-party server holds information about a corresponding third-party application. In other words, content included in "sub" and "aud" in the valid payload of the JWT may be the same. Other "exp", "nbf", "iat", and "jti" in the standard registration declaration may be defined based on a JWT standard. A public declaration and a private declaration in the valid payload may be added, or may not be added. This is not limited in this embodiment of this application.

For example, the third-party server sends the registry shown in step S701. For ease of understanding, an example of a JWT character string is as follows:
(1Edor06VsUexUdViEOQCDxwuxdbcOwOJYiQau
  Wd.AtYO73s3mE-Up83tXU
  DLdzWQ_7rEda95q4J8dXRL1sIdq7eWh6Go33twax
  bVw48JdZuup8OhfwyYKF51o.j3kJH
  mHOH3vSwpi4apW-
  uS3_fFqpEPLwGJPtmvvjXMntpZv0BqOKIOIm1Z
  subytfFNpDC8cq7_ht2AEECn1kKtcL0yEi_Qm1C).

The three character strings separated by (.) are three parts of the JWT, that is, an encoded header, an encoded valid payload, and a hash signature.

In step S707, the first server determines, based on a record query return result, whether the target DNS record is obtained.

If the record query return result does not include the target DNS record, in this step, the first server cannot obtain the target DNS record, and it may be considered that the third-party server (that is, an initiator of the registration request) does not have the ownership of the domain name in the delivery address. In this case, the first server may directly perform step S711b, return the error code, and reject the registration request of the third-party server this time.

If the record query return result includes the target DNS record, in this step, the first server can obtain the target DNS record, and it may be considered that the third-party server (that is, the initiator of the registration request) has a DNS maintenance permission of the domain name and has legal ownership. The first server may cache the target DNS record, and a next step is performed.

Because a party without domain name ownership cannot add a record to the DNS, even if an illegal individual can spoof a domain name to deliver a registration request, the illegal individual cannot add a record to the DNS based on an agreement with the first server, and the first server rejects registration of the illegal individual, thereby improving security and reliability of an event delivery process. This step can prevent the following possible cases.

1. The malicious device spoofs the real third-party server domain name to deliver the registration request, but does not change the domain name in the delivery address. In this case, the malicious device does not have a DNS record maintenance permission corresponding to the delivery domain name. Therefore, the malicious device cannot add the target DNS record to the DNS server, and the first server may reject registration of the malicious device, to prevent event information from being stolen.
2. The malicious device spoofs the real third-party server domain name to deliver the registration request, but changes the domain names in the delivery address and the public key address (by performing step S703), and publishes the public key in the corresponding public key address (by performing step S705). The public key may be the public key of the third-party server stolen by the malicious device, or may be a public key of the malicious device. However, the malicious device does not have the ownership of the domain name in the delivery address, and/or the malicious device does not know the keyword corresponding to the target DNS record. In this case, the first server cannot find the target DNS record on the DNS server corresponding to the delivery domain name in the registration request, and the first server may reject registration of the malicious device, to prevent the event information from being stolen.

Optionally, the first server may query the target DNS record by using an nslookup command. For example, the third-party server sends the registry shown in step 5701. An example of the target DNS record that is obtained by querying the DNS server by using the nslookup command by the first server is as follows:
an example of the nslookup command:
nslookup qt=TXT cloud.example.com; and
an example of the result being as follows:
Welcome cloud.example.com
[verify_key=1Edor06VsUexUdViEOQCDxwuxdbcOw
  OJYiQauWd.AtYO73s3mE-
  Up83tXUDLdzWQ_7rEda95q4J8dXRL1sIdq7eWh6
  Go33twaxbVw48JdZuup8OhfwyYKF51o.j3kJHm
  HOH3vSwpi4apW-
  uS3_fFqpEPLwGJPtmvvjXMntpZv0BqOKIOIm1Z
  subytfFNpDC8cq7_ht2AEECn1kKtcL0yEi_Qm1C].

"verify_key" is followed by the example of the JWT character string. Herein, the keyword (for example, "verify_key") and the value JWT character string of the keyword indicated by the third-party server in the registration request are the target DNS record. After obtaining the target DNS record through querying, the first server caches the target DNS record.

It should be noted that in this embodiment of this application, the steps of obtaining the public key of the third-party server in steps S704 and S705 and the steps of obtaining the target DNS record in steps S706 and S707 may be performed in a sequence shown in FIG. 7A and FIG. 7B, or may be performed in another sequence, or may be performed at the same time. This is not limited in this embodiment of this application. This is merely an example for description herein.

In step S708, the first server extracts an authentication string from the target DNS record.

In this embodiment of this application, the first server determines, based on the keyword in the third field, whether the target DNS record is obtained. However, the first server does not know whether the target DNS has specific content and what the content is. Therefore, further determining needs to be performed to determine whether the target DNS record is added by the third-party server. The authentication string in the target DNS record is the JWT character string. The authentication string extracted in this step is used for subsequent JWT signature authentication to prove that the target DNS record is written by a third-party server into the DNS server and has not been tampered with.

In this step, if the first server does not extract the authentication string, the first server may directly perform step S711b, return the error code, and reject the registration request of the third-party server this time.

If the first server extracts the authentication string, a next step is performed.

In this step, if the malicious device intends to achieve a spoofing purpose by guessing a query keyword, for example, the malicious device guesses the query keyword, adds a DNS record to the DNS server corresponding to the delivery domain name, but does not write the DNS record into the authentication string, and the first server cannot extract the authentication string, registration of the malicious device may be rejected, to prevent the event information from being stolen.

In a process of extracting the authentication string, the first server may determine the target DNS record from the cache based on the query keyword obtained in step S702, and extract the authentication string corresponding to the query keyword.

For example, the target DNS record provided in step S707 is used. In this step, the first server extracts the authentication string (1Edor06VsUexUdViEOQCDxwuxdbcOwOJYiQauWd. AtYO73s3mE-Up83tXUDLdzWQ_7rEda95q4J8dXRL1sIdq7eWh6Go 33twaxbVw48JdZuup8OhfwyYKF51o.j3kJHmHOH3v Swpi4apW-uS3_fFqpEPLwGJPtmvvjXMntpZv0BqOKIOIm1Zsubytf FNpDC8cq7_ht2AEECn1kKtcL0yEi_Qm1C) corresponding to "verify_key".

In step S709, the first server performs authentication on the authentication string.

In this step, the first server mainly performs authentication on at least one of the following aspects.
1. Whether the issuer domain name (that is, the third domain name) of "iss" in the authentication string is the same as an authentication domain name (that is, the first domain name) in the public key address is authenticated.
2. Whether the issuer domain name (that is, the third domain name) of "iss" in the authentication string, the authentication domain name (that is, the first domain name) in the public key address, the delivery domain name (that is, the second domain name) in the delivery address, and the domain name (that is, the fourth domain name) in a redirection address (redirect_uri) corresponding to the third-party application (or website) are the same is authenticated.
3. Whether a signature in the authentication string is valid and whether signature data is tampered with are authenticated.

It is very difficult for a malicious attacker to implement step S709. Therefore, when the first server authenticates only the first aspects and the third aspect, the method 700 can already avoid most of spoofing problems. When the first server authenticates the foregoing three aspects, security of the event delivery process is further improved.

Specifically, the redirection address (redirect_uri) in this embodiment of this application is created in an account registration process by the third-party application (or website) corresponding to the third-party server, and is equivalent to a URL of an application. For example, the third-party server registers an account in an account system, and the account is associated with the third-party application. The domain name in the redirection address is a trusted application domain name. The redirection address is configured in a background of a device and cannot be changed. The first server may obtain the redirection address or the trusted application domain name in the redirection address from the account system based on an application identifier (client ID) provided by the third-party server. In this embodiment of this application, when it is authenticated that the issuer domain name, the authentication domain name, and the delivery domain name are consistent with the domain name in the redirection address, it can be proved that the domain name is not spoofed.

In this embodiment of this application, a process of authenticating whether the signature of the check string is valid and whether the signature data is tampered with may also be referred to as a signature authentication (that is, signature authentication) process. In the signature authentication process, the first server performs JWT signature authentication on the authentication string by using the public key obtained in step S705. The public key is corresponding to the private key used by the third-party server in the JWT signature.

As mentioned above, the third-party server may publish a plurality of public keys in a domain name directory of the third-party server, and the third-party server may indicate, in the registration request, the first server to obtain a specific public key for signature authentication. Alternatively, the third-party server indicates, in the target DNS record, a specific private key used by the third-party server to perform signature, and indicates a private key identifier to the first server. In this way, the first server may obtain, based on the private key identifier, a public key corresponding to the private key.

A signature authentication process of the first server is roughly as follows: The first server decrypts the hash signature in the JWT character string by using the public key, to obtain an encoded header and an encoded valid payload of the JWT. The encoded header and the encoded valid payload that are obtained by decrypting the hash signature are respectively compared with the first part and the second part of the JWT character string. If the encoded header and the encoded valid payload and the first part and the second part are the same, signature authentication succeeds.

In step S710, determine whether the authentication succeeds.

It is determined, based on an authentication result in step S709, whether the authentication succeeds. If the authentication fails, it may be considered that the third-party server does not have the ownership of the domain name related to the delivery address. In this case, the first server may directly perform step S711b, return the error code, and reject the registration request of the third-party server this time.

If the authentication succeeds, a next step is performed.

In step S711a, save the registry, and return a success code.

It should be understood that the service registration process steps shown in this embodiment of this application merely show an example of operations that can be performed by the third-party server and the first server. A specific operation execution sequence may be correspondingly adjusted based on an actual requirement. For example, some steps may be combined into one step for processing, some steps may be performed simultaneously or may be performed in another sequence. Details are not described herein again.

After performing successful registration, the third-party server may receive, based on a prior-art process, the event information delivered by the first server. Specifically, the third-party server may perform operations in step S303 and step S304 in FIG. 3. For brevity, details are not described herein again.

The foregoing describes the method embodiments of the embodiments of this application in detail with reference to FIG. 1 to FIG. 7A and FIG. 7B. The following describes apparatus embodiments of the embodiments of this application in detail with reference to FIG. 8 to FIG. 11. It should be understood that the descriptions of the method embodiments correspond to descriptions of the apparatus embodiments. Therefore, for parts that are not described in detail, refer to the descriptions in the foregoing method embodiments.

Figure 8:
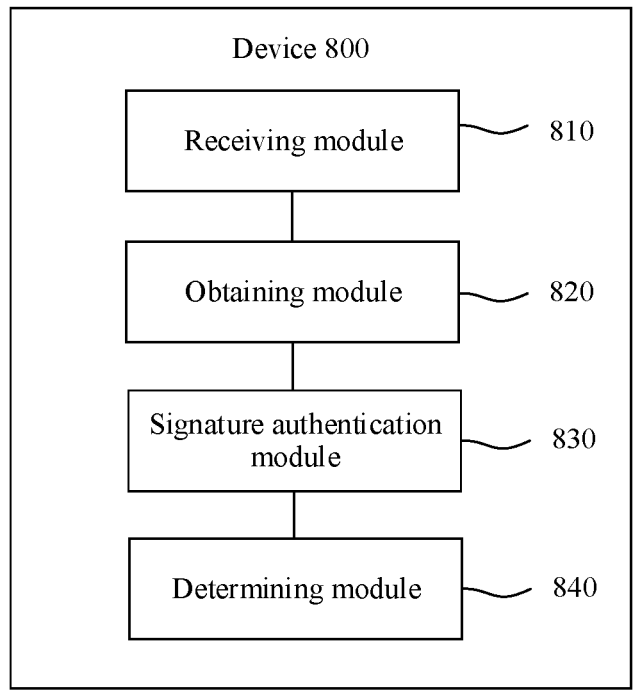
FIG. 8 is a schematic block diagram of a device according to an embodiment of this application.

FIG. 8 is a schematic diagram of a structure of a device according to an embodiment of this application. The device 800 in FIG. 8 may be the first server mentioned above, for example, may be a specific example of the first server 110 shown in FIG. 1 or the first server 220 shown in FIG. 2. The device 800 may be configured to implement the foregoing steps performed by the first server, for example, the method in FIG. 4 or FIG. 5, and may be further configured to specifically implement the embodiment shown in FIG. 7A and FIG. 7B. To avoid redundancy, the description is not repeated.

The device 800 shown in FIG. 8 includes a receiving module 810, an obtaining module 820, a signature authentication module 830, and a determining module 840.

The receiving module 810 is configured to receive a registration request sent by a third-party server.

The registration request is used to request to register an event delivery service.

The registration request includes first information, second information, and third information.

The first information is used to indicate a public key address of the third-party server, and the public key address includes a first domain name; the second information is used to indicate a delivery address of event information, and the delivery address includes a second domain name; and the third information is used to indicate a target DNS record on a domain name system DNS server, and the target DNS record includes a digital signature created by the third-party server by using a private key of the third-party server.

The obtaining module 820 is configured to: when the first domain name is the same as the second domain name, attempt to obtain a public key of the third-party server based on the first information; and attempt to obtain the target DNS record based on the third information.

The signature authentication module 830 is configured to: when the public key of the third-party server and the target DNS record are obtained, perform signature authentication on the digital signature in the target DNS record based on the public key of the third-party server, to obtain a signature authentication result.

The determining module 840 is configured to: determine, based on the signature authentication result, whether to allow the third-party server to perform registration.

Optionally, the third information includes a keyword, and the obtaining module 820 is specifically configured to query the DNS server for the target DNS record based on the keyword.

Optionally, the target DNS record includes a JSON object-based web token JWT, and the JWT includes the digital signature.

Optionally, the JWT includes at least one piece of the following information: a third domain name, where the third domain name is used to indicate an issuer of the JWT; an identifier of a third-party developer corresponding to the third-party server; and an application identifier corresponding to the third-party server, where the application identifier is used to identify an application corresponding to the third-party server.

Optionally, the signature authentication module 830 is specifically configured to: extract an authentication string from the target DNS record; and when the authentication string is extracted, perform signature authentication on the authentication string based on the public key of the third-party server.

Optionally, the first information is carried in a first field, the third information is carried in a third field, and the first field and the third field belong to a same node.

Optionally, the determining module 840 is configured to: when the first domain name is different from the second domain name, determine not to allow the third-party server to perform registration.

Optionally, the determining module 840 is configured to: when the public key of the third-party server and/or the target DNS record are/is not obtained, determine not to allow the third-party server to perform registration.

Optionally, the determining module 840 is configured to: when the authentication string is not extracted, determine not to allow the third-party server to perform registration.

Optionally, the event delivery service includes an open identity openID account risk event delivery.

Figure 9:
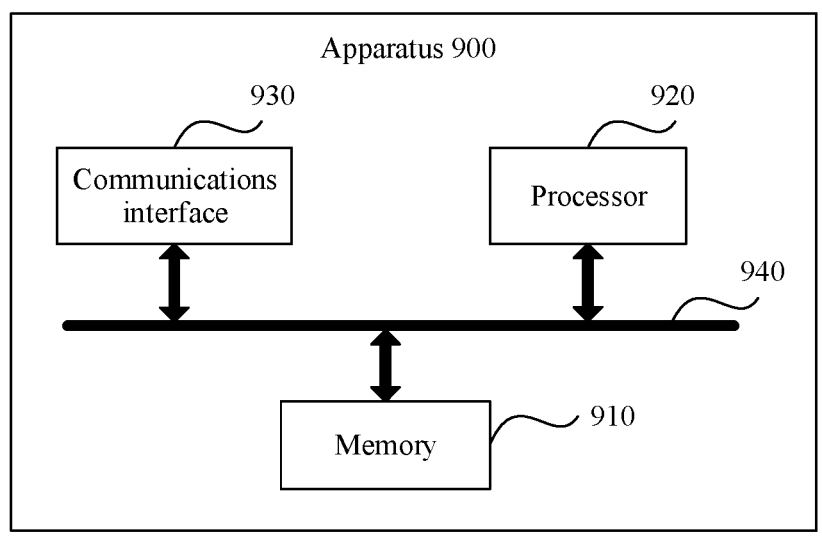
FIG. 9 is a schematic block diagram of another device according to an embodiment of this application.

FIG. 9 is a schematic diagram of a structure of an apparatus according to an embodiment of this application. The apparatus 900 in FIG. 9 may be a specific example of the first server 110 in FIG. 1 or the first server 220 in FIG. 2. The apparatus shown in FIG. 9 may be configured to perform the method in FIG. 4 or FIG. 5, and specifically implement the embodiment shown in FIG. 7A and FIG. 7B. To avoid redundancy, the description is not repeated.

The apparatus 900 may be the foregoing first server, or may be an apparatus in the first server, or may be an apparatus that can be used in matching with the first server. The apparatus 900 may be a chip system. In this embodiment of this application, the chip system may include a chip, or may include a chip and another discrete component. The apparatus 900 includes at least one processor 920, configured to implement the method provided in embodiments of this application. For details, refer to detailed descriptions in the method examples. Details are not described herein again.

The apparatus 900 may further include at least one memory 910, configured to store program instructions and/or data. The memory 910 is coupled to the processor 920. The coupling in this embodiment of this application may be an indirect coupling or a communication connection between apparatuses, units, or modules in an electronic form, a mechanical form, or another form, and is used for information exchange between the apparatuses, the units, or the modules. The processor 910 may cooperate with the memory 920. The processor 910 may execute the program instructions stored in the memory 920. At least one of the at least one memory may be included in the processor.

The apparatus 900 may further include a communications interface 930, configured to communicate with another device through a transmission medium, so that an apparatus in the apparatus 900 can communicate with the another device. For example, the communications interface may be a transceiver, a circuit, a bus, a module, a pin, or a communications interface of another type. For example, the apparatus 900 is a first server, and the another device is a third-party server. The processor 920 receives and sends data through the communications interface 930, and is configured to implement the method executed by the first server in the embodiment corresponding to FIG. 4 to FIG. 6.

In this embodiment of this application, a specific connection medium between the communications interface 930, the processor 920, and the memory 910 is not limited. In this embodiment of this application, in FIG. 9, the memory 910, the processor 920, and the communications interface 930 are connected through a bus 940.

Figure 10:
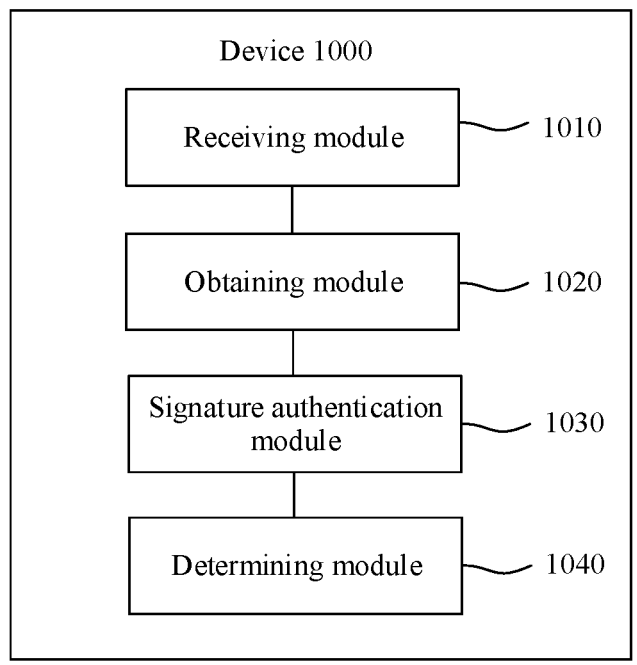
FIG. 10 is a schematic block diagram of an apparatus according to an embodiment of this application.

FIG. 10 is a schematic diagram of a structure of a device according to an embodiment of this application. The device 1000 in FIG. 10 may be the first server mentioned above, for example, may be a specific example of the first server 110 shown in FIG. 1 or the first server 220 shown in FIG. 2. The device 1000 may be configured to implement the foregoing steps performed by the first server, for example, the method in FIG. 4 or FIG. 6, and may be further configured to specifically implement the embodiment shown in FIG. 7A and FIG. 7B. To avoid redundancy, the description is not repeated.

The device 1000 shown in FIG. 10 includes a receiving module 1010, an obtaining module 1020, a signature authentication module 1030, and a determining module 1040.

The receiving module 1010 is configured to receive a registration request sent by a third-party server.

The registration request is used to request to register an event delivery service.

The registration request includes first information, second information, and third information.

The first information is used to indicate a public key address of the third-party server, and the public key address includes a first domain name; the second information is used to indicate a delivery address of event information, and the delivery address includes a second domain name; and the third information is used to indicate a target DNS record on a domain name system DNS server, and the target DNS record includes a digital signature created by the third-party server by using a private key of the third-party server and an application identifier corresponding to the third-party server. The application identifier is used to identify an application corresponding to the third-party server.

The obtaining module 1020 is configured to: when the first domain name is the same as the second domain name, attempt to obtain a public key of the third-party server based on the first information; and attempt to obtain the target DNS record based on the third information.

The signature authentication module 1030 is configured to: when the public key of the third-party server and the target DNS record are obtained, perform signature authentication on the digital signature in the target DNS record based on the public key of the third-party server, to obtain a signature authentication result.

The obtaining module 1020 is configured to: when the signature authentication result succeeds, obtain, based on the application identifier corresponding to the third-party server, a redirection address of the application corresponding to the third-party server. The redirection address includes a fourth domain name.

The determining module 1040 is configured to: when the second domain name is the same as the fourth domain name, determine to allow the third-party server to perform registration.

Optionally, the third information includes a keyword, and the obtaining module 1020 is specifically configured to query the DNS server for the target DNS record based on the keyword.

Optionally, the target DNS record includes a JSON object-based web token JWT, and the JWT includes the digital signature.

Optionally, the JWT includes at least one piece of the following information: a third domain name, where the third domain name is used to indicate an issuer of the JWT; an identifier of a third-party developer corresponding to the third-party server; and the application identifier corresponding to the third-party server.

Optionally, the signature authentication module 1030 is specifically configured to: extract an authentication string from the target DNS record; and when the authentication string is extracted, perform signature authentication on the authentication string based on the public key of the third-party server.

Optionally, the first information is carried in a first field, the third information is carried in a third field, and the first field and the third field belong to a same node.

Optionally, the determining module 840 is configured to: when the first domain name is different from the second domain name, determine not to allow the third-party server to perform registration.

Optionally, the determining module 840 is configured to: when the public key of the third-party server and/or the target DNS record are/is not obtained, determine not to allow the third-party server to perform registration.

Optionally, the determining module 840 is configured to: when the signature authentication result fails, determine not to allow the third-party server to perform registration.

Optionally, the determining module 840 is configured to: when the second domain name is different from the fourth domain name, determine not to allow the third-party server to perform registration.

Optionally, the determining module 840 is configured to: when the authentication string is not extracted, determine not to allow the third-party server to perform registration.

Optionally, the event delivery service includes an openID account risk event delivery.

Figure 11:
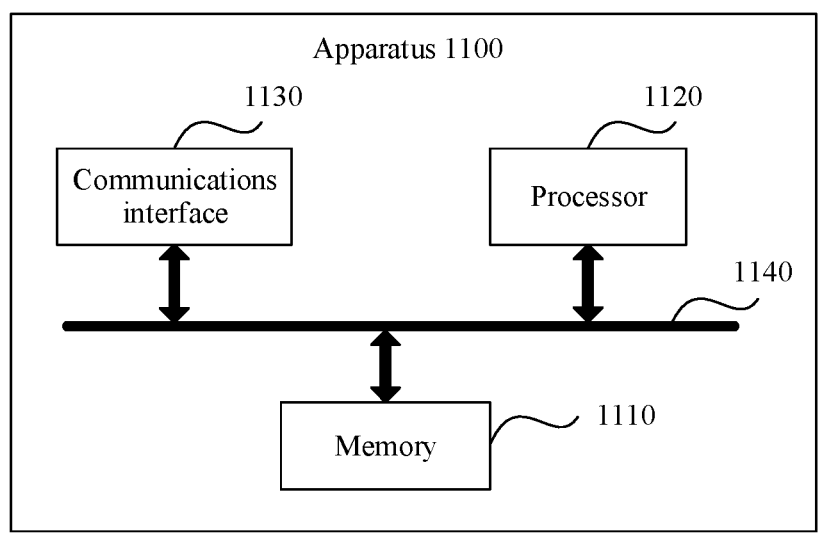
FIG. 11 is a schematic block diagram of an apparatus according to an embodiment of this application.

FIG. 11 is a schematic diagram of a structure of an apparatus according to an embodiment of this application. The apparatus 1100 in FIG. 11 may be a specific example of the first server 110 in FIG. 1 or the first server 220 in FIG. 2. The apparatus shown in FIG. 11 may be configured to perform the method in FIG. 4 or FIG. 6, and specifically implement the embodiment shown in FIG. 7A and FIG. 7B. To avoid redundancy, the description is not repeated.

The apparatus 1100 may be the foregoing first server, or may be an apparatus in the first server, or may be an apparatus that can be used in matching with the first server. The apparatus 1100 may be a chip system. In this embodiment of this application, the chip system may include a chip, or may include a chip and another discrete component. The apparatus 1100 includes at least one processor 1120, configured to implement the method provided in embodiments of this application. For details, refer to detailed descriptions in the method examples. Details are not described herein again.

The apparatus 1100 may further include at least one memory 1110, configured to store program instructions and/or data. The memory 1110 is coupled to the processor 1120. The coupling in this embodiment of this application may be an indirect coupling or a communication connection between apparatuses, units, or modules in an electronic form, a mechanical form, or another form, and is used for information exchange between the apparatuses, the units, or the modules. The processor 1110 may cooperate with the memory 1120. The processor 1110 may execute the program instructions stored in the memory 1120. At least one of the at least one memory may be included in the processor.

The apparatus 1100 may further include a communications interface 1130, configured to communicate with another device through a transmission medium, so that an apparatus in the apparatus 1100 can communicate with the another device. For example, the communications interface may be a transceiver, a circuit, a bus, a module, a pin, or a communications interface of another type. For example, the apparatus 1100 is a first server, and the another device is a third-party server. The processor 1120 receives and sends data through the communications interface 1130, and is configured to implement the method executed by the first server in the embodiment corresponding to FIG. 4 to FIG. 6.

In this embodiment of this application, a specific connection medium between the communications interface 1130, the processor 1120, and the memory 1110 is not limited. In this embodiment of this application, in FIG. 11, the memory 1110, the processor 1120, and the communications interface 1130 are connected through a bus 1140.

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service registration method, comprising:
receiving a registration request from a third-party server, wherein the registration request is used to request to register an event delivery service, and wherein the registration request comprises first information, second information, and third information,
wherein:
the first information is used to indicate a public key address of the third-party server, and the public key address comprises a first domain name;
the second information is used to indicate a delivery address of event information, and the delivery address comprises a second domain name; and
the third information is used to indicate a target domain name system (DNS) record on a DNS server, and the target DNS record comprises a digital signature created by the third-party server by using a private key of the third-party server;
based on the first domain name being the same as the second domain name;
attempting to obtain a public key of the third-party server based on the first information; and
attempting to obtain the target DNS record based on the third information; and
based on the public key of the third-party server and the target DNS record being obtained;
performing signature authentication on the digital signature in the target DNS record based on the public key of the third-party server, to obtain a signature authentication result; and determining, based on the signature authentication result, whether to allow the third-party server to perform registration.

2. The method according to claim 1, wherein the third information comprises a keyword, and the attempting to obtain the target DNS record based on the third information comprises:
    querying the DNS server for the target DNS record based on the keyword.

3. The method according to claim 1, wherein the target DNS record comprises a JSON object-based web token (JWT), and the JWT comprises the digital signature.

4. The method according to claim 3, wherein the JWT comprises at least one piece of the following information:
    a third domain name, wherein the third domain name is used to indicate an issuer of the JWT;
    an identifier of a third-party developer corresponding to the third-party server; or
    an application identifier corresponding to the third-party server, wherein the application identifier is used to identify an application corresponding to the third-party server.

5. The method according to claim 1, wherein the performing signature authentication on the digital signature in the target DNS record based on the public key of the third-party server comprises:
    extracting an authentication string from the target DNS record; and
    based on the authentication string being extracted, performing signature authentication on the authentication string based on the public key of the third-party server.

6. The method according to claim 1, wherein the first information is carried in a first field, the third information is carried in a third field, and the first field and the third field belong to a same node.

7. The method according to claim 1, wherein the method further comprises:
    based on the first domain name being different from the second domain name, determining not to allow the third-party server to perform registration; or
    based on the public key of the third-party server and/or the target DNS record not being obtained, determining not to allow the third-party server to perform registration.

8. The method according to claim 1, the method further comprises:
    based on the authentication string not being extracted, determining not to allow the third-party server to perform registration.

9. The method according to claim 1, wherein the event delivery service comprises an open identity (openID) account risk event delivery.

10. A service registration method, comprising:
    receiving a registration request from a third-party server, wherein the registration request is used to request to register an event delivery service, and wherein the registration request comprises first information, second information, and third information,
    wherein;
        the first information is used to indicate a public key address of the third-party server, and the public key address comprises a first domain name;
        the second information is used to indicate a delivery address of event information, and the delivery address comprises a second domain name; and
        the third information is used to indicate a target domain name system (DNS) record on a DNS server, and the target DNS record comprises a digital signature created by the third-party server by using a private key of the third-party server and an application identifier corresponding to the third-party server, wherein the application identifier is used to identify an application corresponding to the third-party server;
        based on the first domain name being the same as the second domain name: attempting to obtain a public key of the third-party server based on the first information, and attempting to obtain the target DNS record based on the third information;
        based on the public key of the third-party server and the target DNS record being obtained: performing signature authentication on the digital signature in the target DNS record based on the public key of the third-party server, to obtain a signature authentication result;
        based on the signature authentication result succeeding: obtaining, based on the application identifier corresponding to the third-party server, a redirection address of the application corresponding to the third-party server, wherein the redirection address comprises a fourth domain name; and
        based on the second domain name being the same as the fourth domain name, determining to allow the third-party server to perform registration.

11. The method according to claim 10, wherein the third information comprises a keyword, and the attempting to obtain the target DNS record based on the third information comprises:
    querying the DNS server for the target DNS record based on the keyword.

12. The method according to claim 10, wherein the target DNS record comprises a JSON object-based web token (JWT), and the JWT comprises the digital signature.

13. The method according to claim 12, wherein the JWT comprises at least one piece of the following information:
    a third domain name, wherein the third domain name is used to indicate an issuer of the JWT;
    an identifier of a third-party developer corresponding to the third-party server; or
    the application identifier corresponding to the third-party server.

14. The method according to claim 10, wherein the performing signature authentication on the digital signature in the target DNS record based on the public key of the third-party server comprises:
    extracting an authentication string from the target DNS record; and
    based on the authentication string being extracted, performing signature authentication on the authentication string based on the public key of the third-party server.

15. The method according to claim 14, wherein the method further comprises:
    based on the authentication string not being extracted, determining not to allow the third-party server to perform registration.

16. The method according to claim 10, wherein the first information is carried in a first field, the third information is carried in a third field, and the first field and the third field belong to a same node.

17. The method according to claim 10, wherein the method further comprises:
    based on the first domain name being different from the second domain name, determining not to allow the third-party server to perform registration; or based on the public key of the third-party server and/or the target DNS record not being obtained, determining not to allow the third-party server to perform registration; or based on the signature authentication result failing, determining not to allow the third-party server to perform registration; or based on the second domain name being different from the fourth domain name, determining not to allow the third-party server to perform registration.

18. The method according to claim 10, wherein the event delivery service comprises an open identity (openID) account risk event delivery.

19. A terminal device, comprising:
a processor; and
a memory that stores a computer program that, when executed by the processor, causes the processor to perform the following steps:
receiving a registration request from a third-party server, wherein the registration request is used to request to register an event delivery service, and wherein the registration request comprises first information, second information, and third information,
wherein:
the first information is used to indicate a public key address of the third-party server, and the public key address comprises a first domain name;
the second information is used to indicate a delivery address of event information, and the delivery address comprises a second domain name; and
the third information is used to indicate a target domain name system (DNS) record on a DNS server, and the target DNS record comprises a digital signature created by the third-party server by using a private key of the third-party server;
based on the first domain name being the same as the second domain name:
attempting to obtain a public key of the third-party server based on the first information; and
attempting to obtain the target DNS record based on the third information; and
based on the public key of the third-party server and the target DNS record being obtained:
performing signature authentication on the digital signature in the target DNS record based on the public key of the third-party server, to obtain a signature authentication result; and
determining, based on the signature authentication result, whether to allow the third-party server to perform registration.

20. A non-transitory computer-readable storage medium storing a computer program that, when run on a computer, causes the computer to perform:
receiving a registration request from a third-party server, wherein the registration request is used to request to register an event delivery service, and wherein the registration request comprises first information, second information, and third information,
wherein:
the first information is used to indicate a public key address of the third-party server, and the public key address comprises a first domain name;
the second information is used to indicate a delivery address of event information, and the delivery address comprises a second domain name; and
the third information is used to indicate a target domain name system (DNS) record on a DNS server, and the target DNS record comprises a digital signature created by the third-party server by using a private key of the third-party server;
based on the first domain name being the same as the second domain name;
attempting to obtain a public key of the third-party server based on the first information; and
attempting to obtain the target DNS record based on the third information; and
based on the public key of the third-party server and the target DNS record being obtained:
performing signature authentication on the digital signature in the target DNS record based on the public key of the third-party server, to obtain a signature authentication result; and
determining, based on the signature authentication result, whether to allow the third-party server to perform registration.

* * * * *

UNITED STATES PATENT AND TRADEMARK OFFICE
CERTIFICATE OF CORRECTION

| | | |
|---|---|---|
| PATENT NO. | : 12,273,461 B2 | Page 1 of 1 |
| APPLICATION NO. | : 18/041367 | |
| DATED | : April 8, 2025 | |
| INVENTOR(S) | : Zhenhui Luo | |

It is certified that error appears in the above-identified patent and that said Letters Patent is hereby corrected as shown below:

On the Title Page

Item (71) Applicant, "HUAWEI TECHNOLOGIES CO., LTD., Guangdong (CN)" should read as -- Petal Cloud Technology Co., Ltd., Dongguan (CN) --.

In the Claims

Claim 1: Column 42, Line 63: "target DNS record being obtained;" should read as -- target DNS record being obtained: --.

Claim 10: Column 43, Line 58: "wherein;" should read as -- wherein: --.

Claim 20: Column 46, Line 29: "second domain name;" should read as -- second domain name: --.

Signed and Sealed this
Thirtieth Day of September, 2025

John A. Squires
*Director of the United States Patent and Trademark Office*